(12) United States Patent
Saccocio

(10) Patent No.: US 6,944,669 B1
(45) Date of Patent: Sep. 13, 2005

(54) SHARING THE PERSONAL INFORMATION OF A NETWORK USER WITH THE RESOURCES ACCESSED BY THAT NETWORK USER

(75) Inventor: Damian M. Saccocio, Washington, DC (US)

(73) Assignee: America Online, Inc., Dulles, VA (US)

( * ) Notice: Subject to any disclaimer, the term of this patent is extended or adjusted under 35 U.S.C. 154(b) by 657 days.

(21) Appl. No.: 09/693,860

(22) Filed: Oct. 23, 2000

Related U.S. Application Data
(60) Provisional application No. 60/160,874, filed on Oct. 22, 1999.

(51) Int. Cl.[7] ............................................. G06F 15/16
(52) U.S. Cl. ....................... 709/229; 709/224; 709/225; 709/226
(58) Field of Search ................................ 709/224, 225, 709/226, 229; 705/10, 26

(56) References Cited

U.S. PATENT DOCUMENTS

| | | | |
|---|---|---|---|
| 5,740,252 A | * 4/1998 | Minor et al. ................. | 713/153 |
| 5,815,665 A | * 9/1998 | Teper et al. ................. | 709/229 |
| 5,845,070 A | * 12/1998 | Ikudome ....................... | 713/201 |
| 5,845,300 A | 12/1998 | Comer et al. | |
| 5,848,396 A | * 12/1998 | Gerace ......................... | 705/10 |
| 5,855,008 A | * 12/1998 | Goldhaber et al. ........... | 705/14 |
| 5,960,411 A | 9/1999 | Hartman et al. | |
| 5,974,398 A | * 10/1999 | Hanson et al. ................ | 705/14 |
| 5,991,735 A | * 11/1999 | Gerace ......................... | 705/10 |
| 6,092,053 A | 7/2000 | Boesch et al. | |
| 6,119,098 A | * 9/2000 | Guyot et al. .................. | 705/14 |
| 6,128,663 A | * 10/2000 | Thomas ....................... | 709/228 |
| 6,223,215 B1 | * 4/2001 | Hunt et al. .................. | 709/217 |
| 6,253,202 B1 | * 6/2001 | Gilmour ........................ | 707/9 |
| 6,286,043 B1 | * 9/2001 | Cuomo et al. ............... | 709/223 |
| 6,385,592 B1 | * 5/2002 | Angles et al. ................ | 705/14 |
| 6,393,407 B1 | * 5/2002 | Middleton et al. ............ | 705/14 |
| 6,415,322 B1 | * 7/2002 | Jaye ........................... | 709/224 |
| 6,466,970 B1 | * 10/2002 | Lee et al. .................... | 709/217 |
| 6,487,538 B1 | * 11/2002 | Gupta et al. .................. | 705/14 |
| 6,606,657 B1 | * 8/2003 | Zilberstein et al. .......... | 709/224 |
| 6,651,095 B2 | * 11/2003 | Barlock et al. .............. | 709/223 |

FOREIGN PATENT DOCUMENTS
WO   WO 01/43033   6/2001

OTHER PUBLICATIONS
Office Action dated Feb. 24, 2004 for U.S. Appl. No. 09/323,415.

* cited by examiner

*Primary Examiner*—Saleh Najjar
(74) *Attorney, Agent, or Firm*—Fish & Richardson P.C.

(57) ABSTRACT

A host-based system for sharing personal information of a network user with the resources accessed by that network user. The host-based system generally involves either or both of two data stores, referred to as passport and wallet. Passport and wallet are host-based collections of routinely requested personal information and can be maintained independently or collectively. A user with a populated passport or wallet can pass selected information to web sites, automatically or with very little effort, to enable an enhanced browsing experience or to assist in the completion of an online transaction.

18 Claims, 27 Drawing Sheets

400

Enter your information.
For your protection, this form is protected by Secure Sockets Layer Encryption (SSL). Make sure all fields marked with an * are completed.

[1] Enter your billing information
Enter your name as it appears on your credit card.
Your address is subject to Address Verification to ensure accurate processing.

405 {
- First Name*: [        ] Initial: [  ]
- Last Name*: [        ]
- Company: [            ]

415 {
- Street 1*: [          ]
- Street 2: [           ]
- City*: [              ]
- State*: [ ▼ ] Zip Code*: [    ]
- Phone*: [             ]
- Email*: [             ]

Shortcut Name for this address: [    ] Enter an easily remembered name for this address, like "Home" or "Mom".

▼Go to the next step

[2] Enter your card information
If you want to use this card as your first choice while shopping, check "Set as default credit card".
Enter your card number WITHOUT any spaces or dashes.

420 {
- Card*: [Visa ▼]
- Card Number*: [         ]
- Expiration*: [08 ▼] [1999 ▼] [VISA] Use Visa.
  The preferred card On Impulse!

Shortcut Name for this card: [    ] Enter an easily remembered name for this card, like "Home Visa" or "Corporate".

▼Go to the next step

[3] Enter your ship-to information
Tell us who you are shipping this purchase to.
Please note that orders are available for delivery in the United States only.

Please note that orders are available for delivery in the United States only.

☐ Check here if this is the same as billing information and click here to continue.

410 {
First Name*: [        ]  Initial: [  ]
Last Name*: [        ]
Company: [              ]
Street 1*: [              ]
Street 2: [              ]
City*: [              ]
State*: [ ▼ ]  Zip Code*: [     ]
Phone: [         ]
Email: [           ]

☑ Set as default ship-to address

Shortcut Name for this address: [      ]  Enter an easily remembered name for this address, like "Home" or "Mom".

▼ Go to the next step

[1] You're almost done! If you like, save your information to use next time.
We can securely save your information so you can use it whenever you see this symbol: $
You'll never have to fill out this form again.

Click a choice ▶
    ◉ $ Save my information.
    ○ Continue my purchase without saving my information.

[          ]
You will still be able to cancel your transaction.

Copyright 1999 Inktomi Corporation.

FIG. 4B amazon.com

Completing Your Order

5. Check your order.

Please verify that the items and quantities shown below are correct. Put a 0 (zero) in the Quantity field to remove a particular item from your order.

Quantity and Item Information:

---

Usually ships in 24 hours

[1] _Evolutionary Game Theory_, By Jorgen W. Weibull:
Our Price: $17.50

---

6. Credit card information:

Since we already have a credit card on file for you, you can just click on the button next to it to use it for this order.

| Cardholder Name | Card Type | Last 5 Digits | Expires |

⊙                                                                              06 ▼  2002 ▼

Or enter a new credit card for billing:

If you're using a new card, please enter the full credit card number below. ( <u>Why this is safe.</u>) If you prefer to phone in your credit card, enter only the last five digits. After you have submitted your order, we'll give you the phone number to call.

Credit card number: [          ]

Type of credit card: ○ Visa  ○ Master card  ○ Discover  ○ American Express  ○ JCB

Credit card expiration date (only month and year required): [Month ▼] [Year ▼]

Cardholder's name as it appears on the credit card: [          ]

Zip or postal code of the billing address for this card: [     ]

---

7. What is your name?

Your name, if it is different from the name on the credit card: [          ]

---

8. What shipping option would you like? (Click here for more about <u>shipping options, prices and international customs.</u>)

Shipping Method:

FIG. 5B

Please note: Total delivery time equals item availability plus shipping time.

⦿ Standard Shipping (3-7 business days)
○ Second Day Air (2 business days)
○ Next Day Air (1 business day)

Please note: we cannot ship Second Day or Next Day Air to P.O. Boxes, APO/FPO addresses, and addresses served by the USPS as domestic destinations, including Guam and the U.S. Virgin Islands.

Number of Shipments:

⦿ Make one shipment when complete order is ready (minimizes shipping cost)
○ Ship as ordered items become available (at extra shipping cost)

Press this button to 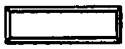.

The next page shows you a summary of your order including its total cost. You may then submit your completed order or back up and make changes.

Copyright and disclaimer © 1996-1999, Amazon.com, Inc.

SHARING THE PERSONAL INFORMATION OF A NETWORK USER WITH THE RESOURCES ACCESSED BY THAT NETWORK USER

RELATED APPLICATIONS

This application is related to U.S. Provisional Application No. 60/160,874, filed Oct. 22, 1999, and entitled "Sharing A User's Personal Information," which application is incorporated by reference in its entirety.

BACKGROUND

The computer system 100 illustrated in FIG. 1 represents a typical hardware setup for executing software that allows users to perform tasks such as communicating with other computer users, accessing various computer resources, and viewing, creating, or otherwise manipulating electronic content—that is, any combination of text, images, movies, music or other sound, animations, 3D virtual worlds, and links to other objects. The system includes various input/output (I/O) devices (mouse 103, keyboard 105, display 107) and a general purpose computer 100 having a central processor unit (CPU) 121, an I/O unit 117, and a memory 109 that stores data and various programs such as an operating system 111, and one or ore application programs 113. The computer system 100 also typically includes some sort of communications card or device 123 (e.g., a modem or network adapter) for exchanging data with a network 127 via a communications link 125 (e.g., a telephone line).

As shown in FIG. 2, a user of a computer system can access electronic content or other resources either stored locally at the user's own client system 202 (for example, a personal or laptop computer) or remotely at one or more server systems 200. An example of a server system is a host computer that provides subscribers with online computer services such as email, e-commerce, chat rooms, Internet access, electronic newspapers, and magazines. Users of a host computer's online services typically communicate with one or more central server systems 200 through client software executing on their respective client systems 202.

In practice, a server system 200 typically is not a single monolithic entity, but is a network of interconnected server computers, possibly physically dispersed from each other, each dedicated to its own set of duties and/or to a particular geographic region. In such a case, the individual servers are connected by a network of communication links in known fashion.

A "browser" is an example of client software that enables users to access and view electronic content stored either locally or remotely, such as in a network environment (local area network (LAN), intranet, and wide area network (WAN) such as the Internet). A browser is typically used for displaying documents described in Hypertext Markup Language (HTML) and stored on servers connected to a network, e.g., the Internet. Technically, a web browser is a client program that uses the Hypertext Transfer Protocol (HTTP) to make requests of web servers throughout the Internet on behalf of the browser user. A web server contains, in addition to the HTML and other files it can serve, an HTTP server daemon, which is a program designed to wait for HTTP requests and handle those requests when received.

FIG. 3 is a screenshot of a browser application 300 (Netscape Navigator) displaying a typical HTML document, or web page 302. As shown therein, a single web page 302 may be composed of several different files potentially of different data types 304 (for example, text, graphics, images, virtual worlds, sounds, or movies). In addition, a web page can include links 306 pointing to other resources (for example, web pages or individual files) available on the network. Links 306 can take virtually any visual form, for example, the links can appear either as a text string or as a graphical image or a combination thereof. Each link 306 has an associated URL pointing to a location on the network. When a user "clicks on" or otherwise selects a displayed link 306, the browser can automatically retrieve a web page or other resource corresponding to the link's associated URL and display it to, or execute it for, the user. A user can instruct a browser to access a HTML document or web page by specifying a network address or Uniform Resource Locator (URL) at which a desired document resides. URLs are defined in Internet standard RFC 1738 to include an indication of the protocol to be used and the location of a resource on a web server. In response to instructions from the user, the browser contacts the corresponding server hosting the requested webpage, retrieves the one or more files that make up the webpage, and then displays the webpage in a window on the user's computer screen.

Web pages can typically be transported using HTTP as defined in Internet standard RFC 2068. HTTP is a set of rules for exchanging files (text, graphic images, sound, video, and other multimedia files) on the World Wide Web (WWW). Relative to the Transmission Control Protocol/Internet Protocol (TCP/IP) suite of protocols which are the basis for information exchange on the Internet, HTTP is an application layer protocol. When a user of a web browser sends a HTTP request by typing in an URL or clicking on a hypertext link, the browser builds a HTTP request and sends it to the address indicated by the URL. The HTTP server daemon in the destination server machine receives the request and, after any necessary processing, the requested file is returned. The response is sent to the browser where it can be displayed to the user. The HTTP protocol response includes various codes detailing the result of the request. For example, return code 404 indicates that the information requested was not found. For transactions requiring security, the HTTP connection can be secured with encryption. This variant is known as Secure HTTP (HTTPS) or Secure Socket Layer (SSL).

HTTPS is a web protocol developed by Netscape Communications, Inc. (Netscape) of Mountain View, Calif. and is implemented in several browsers. The HTTPS protocol encrypts and decrypts user page requests as well as the pages that are returned by the web server. HTTPS uses Netscape's SSL as a sublayer under its regular HTTP application layer. HTTPS uses port 443 instead of HTTP port 80 in its interactions with the lower layer, TCP/IP. SSL uses a key size of a predetermined number of bits (typically between 40 and 128) for the RC4 stream encryption algorithm, which is considered a minimal degree of encryption for commercial exchange.

When visiting an electronic commerce merchant, a user typically is presented with a web page order form URL that starts with "https://", indicating the use of the HTTPS protocol. When sending the response, the browser will use the HTTPS layer for encryption. The acknowledgement received from the server also will travel in encrypted form using HTTPS, and will be decrypted by the browser's HTTPS layer.

HTTPS and SSL support the use of X.509 digital certificates form the server so that, if necessary, a user can authenticate (i.e., confirm the identity of) the sender. SSL is an open, nonproprietary protocol that Netscape has proposed as a standard to the World Wide Web Consortium (W3C). HTTPS is not to be confused with SHTTP, a security-enhanced version of HTTP developed and proposed as a standard by EIT.

A digital certificate is an electronic token that establishes the credentials of a party doing business or other transactions on the web. Certificates can be issued by a certification authority (CA). Typically, certificates can contain a party's names, a serial number, expiration dates, a copy of the certificate holder's public key (used for encrypting and decrypting messages and digital signatures), and the digital signature of the certificate-issuing authority so that a recipient can verify that the certificate is real. Some digital certificates conform to a standard, X.509. Digital certificates can be kept in registries so authenticated users can look up other user's public keys.

HTTP also includes a mechanism referred to as a "cookie," which is used to maintain client side persistent data. A cookie is a token, for example, a special text file, that a web site stores on a user's hard disk so that the web site can remember something about the user at a later time. Typically, a cookie records a user's preferences when using a particular site. Under HTTP, each request for a web page is independent of all previous requests. For this reason, a web page server has no memory of what pages it has sent to a user previously or anything about that user's previous visits. The cookie mechanism can allow the server to store its own file on the user's own computer. The file can be typically stored in a subdirectory of the directory used to install the browser software. The cookie subdirectory can contain cookie files for each web site visited by the user that uses cookies. Cookies are commonly used to keep track of which banner ads a user already has encountered. This tracking can assist web sites in rotating the banner ads presented and thereby minimize repetition to the user based on a user's browser type or other information provided to the web site. In order for cookies to be used for tracking, web users must agree to let cookies be saved on their computers by configuring their browsers to accept cookies.

Consumers can buy and sell products and services shown on web pages via electronic commerce ("e-commerce") transactions. To enable these transactions, a consumer and merchant exchange personal and financial information concerning the online transaction, such as their credit card, billing address, and shipping address. Conventional payment systems associated with many Internet commerce sites therefore require customers to type their credit card and mailing information into a HTML form.

FIGS. 4A and 4B show an example of an e-commerce form 400. The information for the form 400 typically includes name 405, shipping address 410, billing address 415, and credit card number 420. This information is submitted to the merchant, who then uses the information to complete the transaction using various known fulfillment and delivery mechanisms.

Navigating and completing such forms involves a great deal of repetition and associated inconvenience to users when providing name, shipping address, billing address, and credit card data to merchants. Completing electronic forms often is a tedious and error-prone process. Furthermore, using these payment systems, customers visiting several online stores may need to re-enter their payment/address information at each online store at which they make a purchase. For many stores, shoppers additionally may need to re-enter payment information at each subsequent visit.

To facilitate the process of completing forms, "form fillers" have been developed. These applications can automate the filling of forms encountered when visiting web sites. The form filler can recognize forms in the HTML and can record the data entered in the fields when the user fills out the form for the first time. Then, when similar fields show up in subsequent forms, the form filler can use the recorded data to automatically fill out these fields. An example of such a form filler is built into Microsoft Internet Explorer 5.0. FIGS. 5A, 5B, and 5C show a form filler application built into a browser automatically filling out the fields in an e-commerce form. Some form fillers can allow the user to maintain several "identities" to help protect privacy. Each identity keeps track of a separate set of form data that will be used to fill in new forms.

A similar, but more sophisticated, approach to facilitating online transactions is the digital wallet. A digital wallet is a software application that allows the user to input shipping and billing data once and reuse this information at many different web sites to complete a purchase. Digital wallets that complete merchant forms or directly transfer data to merchants have been successfully built into browsers in several ways, including as helper applications to browsers, stand-alone applications, and browser plug-ins.

Once the digital wallet is set up, the user can store, manipulate, and pay for Internet purchases with various types of payment instruments, e.g., credit cards or electronic cash.

Client-based personal electronic wallets have been developed to relieve this burden. Client-based wallets store e-commerce information for a particular user at the machine operated by that user. When that machine interfaces with a merchant website through the Internet, e-commerce information stored in the local wallet may be transferred to the merchant. However, because client-based wallets reside on the user machine, these wallets are subject to the limitations of the machine upon which they reside. For instance, security attacks on the user machine may be used to target the wallets residing thereon. In addition, limitations on portability for the machine result in limitations for the wallet.

SUMMARY

One or more of the following advantages may be provided. The techniques and methods described here may enable the user to drastically reduce the amount of work required to fill out forms on web pages. This may be accomplished in one or more of the following ways. First, multiple pages of content may be completed without requiring the user to view each page. Presenting only those fields and forms that are not automatically completed minimizes the work for users. Users can be selectively queried for any merchant-specific missing fields, thus optimizing the form filling process. Users need not inspect each form and approve its contents. Further, merchants using the techniques and methods described here may be able to provide information that is tailored and customized for the user, thus increasing the usefulness of the merchant's content to the user.

Other advantages for the user include ease of use since no additional software is required. Further, as the user is not tied to a single computer, the user's information can be accessed from any computer capable of accessing the merchant's site, regardless of location. In addition, the security of the user improves because risks associated with data sniffing on the user's local area network and accessing storage devices attached to the user's computer can be reduced.

The merchant can access specific information about a customer's preferences and history and use that information to customize the content presented. Merchants can track completed purchases in order to better handle service and information requests. Because merchants can access the information using a protocol, merchants can easily modify forms without causing problems with many different types of software. Merchants can obtain demographic data for future targeted advertising. An intimate relationship between the merchant, the user, and the online service can be fostered.

These techniques and methods can be generalized and applied to a variety of user preference data, e.g., travel preferences, in addition to shipping, billing, and demographic data. These techniques can be implemented as a system, method, software, or some combination thereof.

Details of one or more implementations are set forth in the accompanying drawings and the description below. Other features and advantages will be apparent from the description and drawings, and from the claims.

DESCRIPTION OF DRAWINGS

FIG. 4A shows a browser displaying an exemplary e-commerce form.

FIG. 4B shows the second page of the e-commerce form of FIG. 4A.

FIG. 5B shows the second page of exemplary results of FIG. 5A.

FIG. 5C shows the third page of exemplary results of FIG. 5A.

FIG. 11A is a screenshot of an exemplary framework registration page.

Like reference symbols in the various drawings may indicate like elements.

DETAILED DESCRIPTION

Quick checkout (QC) is a host-based system for sharing personal information of a network user with the resources accessed by that network user. QC generally involves either or both of two data stores, referred to as passport and wallet. Passport and wallet can be host-based collections of routinely requested personal billing, shipping and demographics information (hereinafter, "personal information"). Passport and wallet can be maintained independently or collectively. A user with a populated passport or wallet can choose to pass selected information to web sites, automatically or with very little effort, to enable an enhanced browsing experience or to assist in the completion of an online transaction.

For instance, when merchants offer QC as a payment option and the user elects to invoke QC, the merchant passes the order information to a pre-determined SSL-enabled QC form that is displayed to the consumer. Payment information and shipping address can be sent from the QC database to the QC form, and the form is confirmed, rejected or modified by the user. In this manner, the user does not need to redundantly enter payment information for each transaction or each merchant. Rather, the user can rely on the wallet for this information, with the user confirming the accuracy of the information. As will be explained in greater detail below, when the wallet includes several options for payment, shipping, etc., the consumer can establish default information, and has the ability to select desired information from among that stored.

This host-based system facilitates an integration with other merchant services as well as the surrounding wallet/passport provider environment. Because the wallet and passport are host-based, the wallet and passport can be portable, updateable, secure, and simple to setup and use.

QC can be used to share many different pieces of a user's personal information, before and during an e-commerce transaction. For instance, using QC, selected user information can be shared with a merchant servers upon a user's access to a web site or later, when performing an e-commerce transaction. More specifically, upon access to a merchant's web site, the merchant can personalize the content and services provided to the user. QC can share a variety of personal information, such as travel preferences, demographic information, food choices, and medical information. Thereafter, upon checkout, personal information of a more specific nature, generally concerning e-commerce information, can be shared. For instance, commercial information such as user name, address, and credit card information can be shared, when appropriate, to further e-commerce transactions. Each user's information can be stored in a "profile" that can be updated. This information can be stored in a proprietary or commercially available relational or object database management system (DBMS), such as provided by Oracle, Inc. or Informix, Inc.

Figure 1:
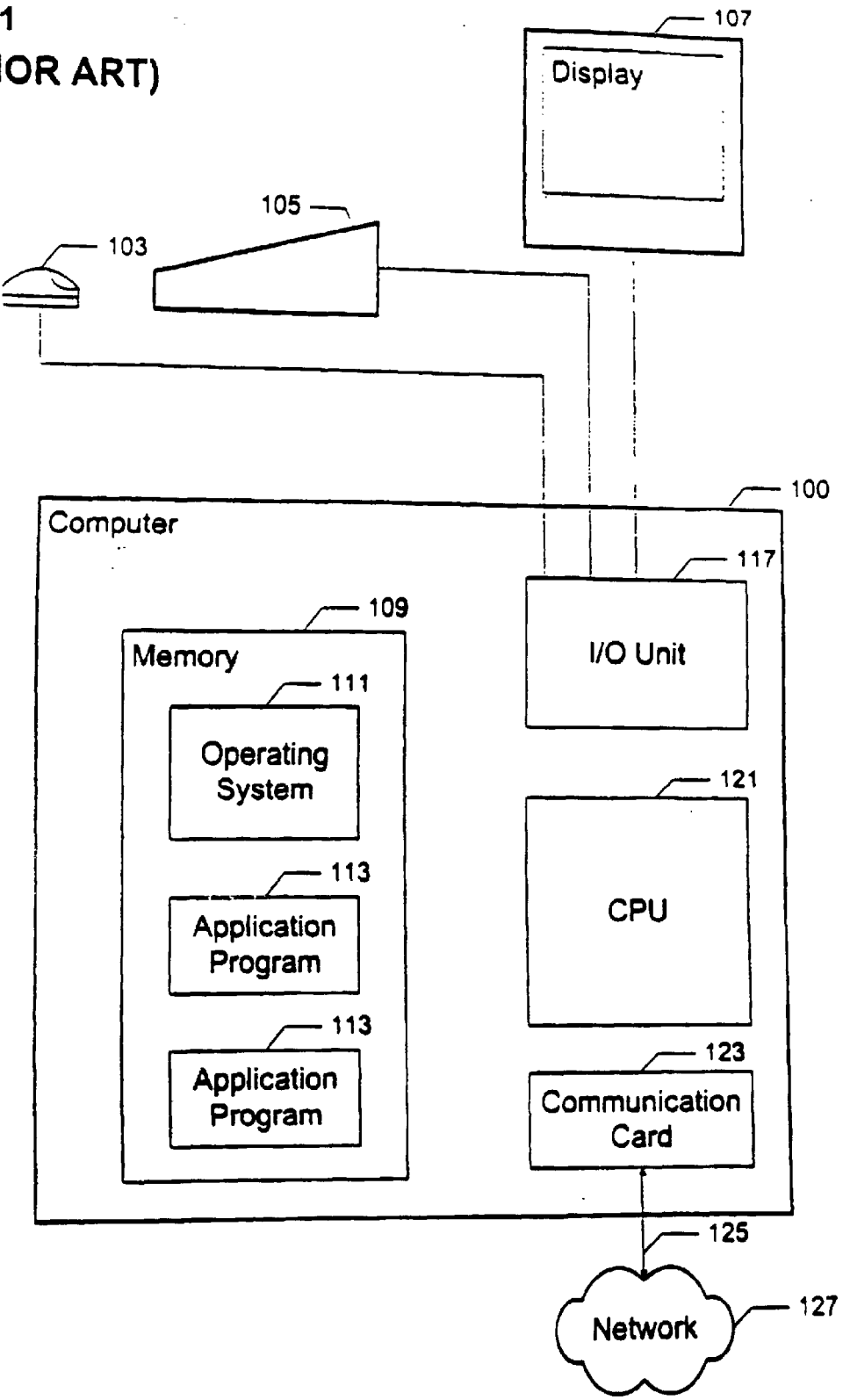
FIG. 1 shows a block diagram of a computer system.
Figure 2:
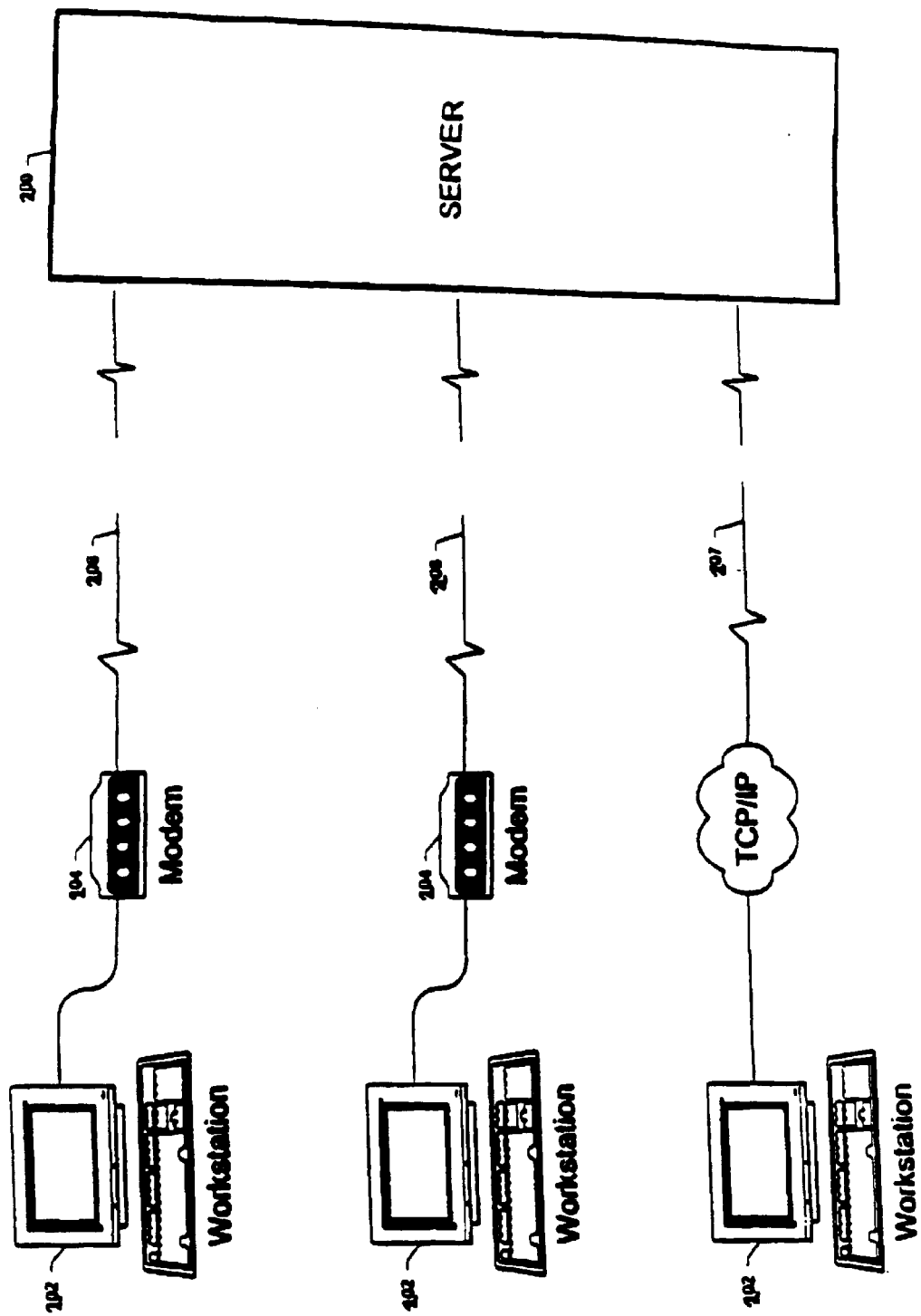
FIG. 2 shows a typical network-computing environment.
Figure 3:
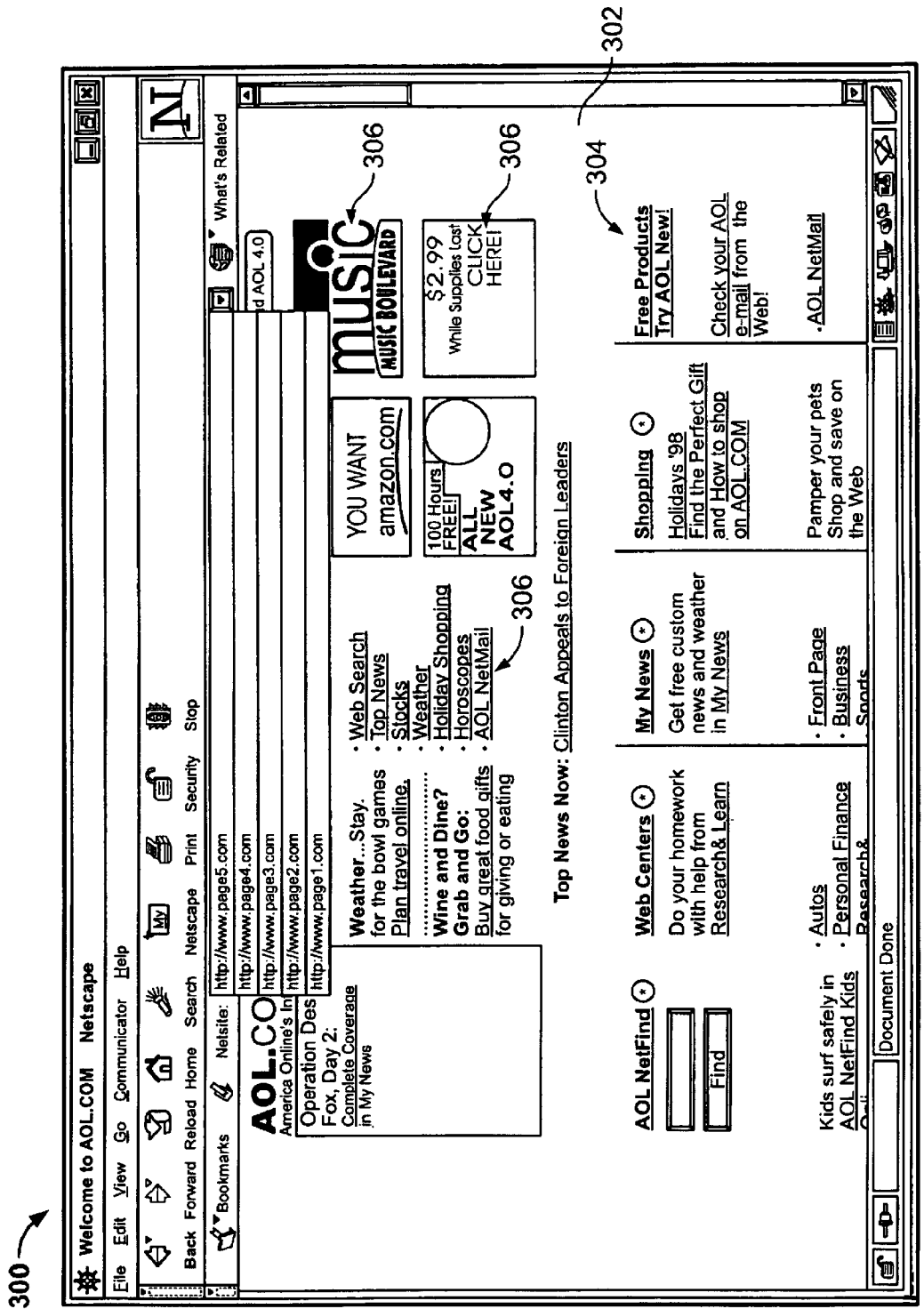
FIG. 3 shows a browser application displaying an exemplary web page.
Figure 5A:
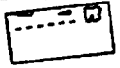
FIG. 5A shows exemplary results of using a form filler application.
Figure 6:
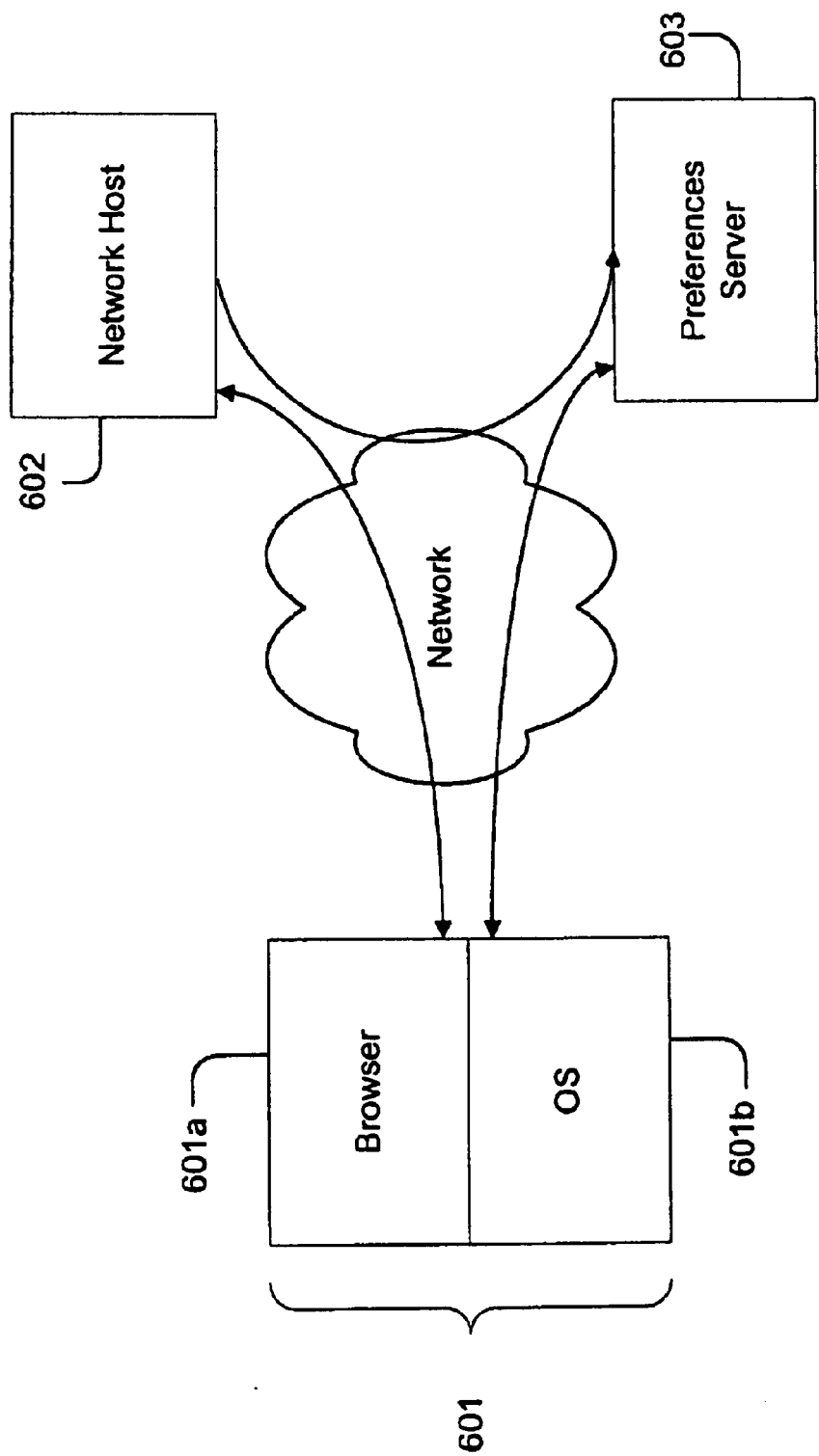
FIG. 6 is a host-to-host architecture for sharing e-commerce transaction information.

FIG. 6 illustrates an exemplary architecture of the framework, known as a "host-to-host" architecture. The client computer 601 of this architecture is not modified. The client computer 601, network host 602, and the preferences server 603 can communicate with each other to exchange user preferences information efficiently with minimal user interaction. Once the preferences server 603 authenticates the user, the network host 602 can communicate with the preferences server 603.

HTTPS is generally used as a transport for requests and responses. However, other protocols could be used as transport mechanisms. Input parameters in requests and return values can be URL-encoded so that nonstandard characters can be properly transmitted over the Internet. Furthermore, return codes from the requests can be used to verify their success.

Although the framework does not require a fixed sequence of requests from network hosts, communications between the user, the merchant, and the framework typically follow a particular pattern, illustrated in FIGS. 7 and 7A, 7B, and 7C. Generally, the process includes authenticating the user, requesting purchase information, requesting payment information, and then placing the order. Each step is described further below with respect to FIGS. 7A–7C, which show client computer 701, merchant web server 702, preferences server 703, preferences database 704, and network 705.

Figure 7:
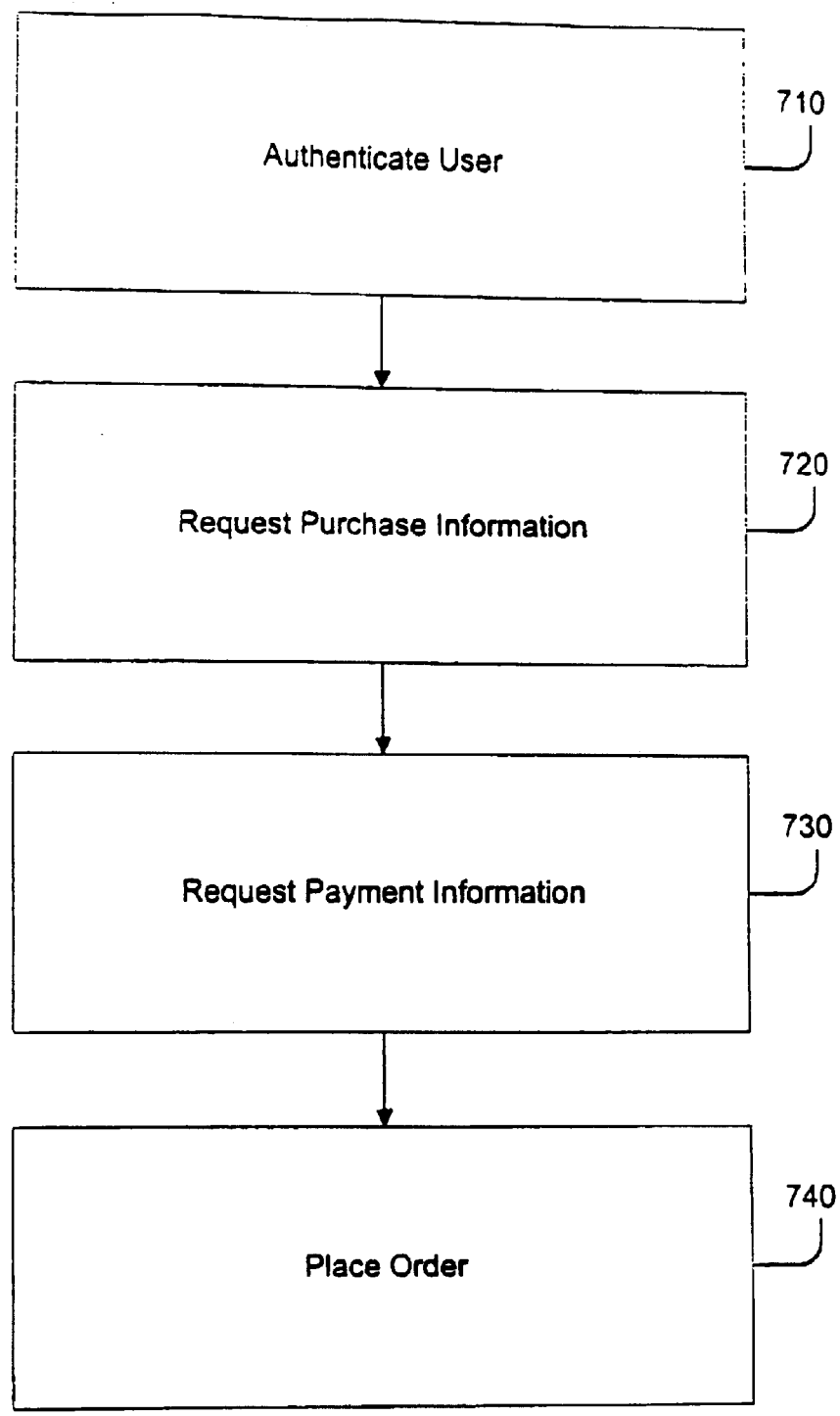
FIG. 7A shows an authentication process.
FIG. 7B shows the process for requesting purchase information.
FIG. 7C shows the process for requesting credit card numbers.
Figure 7A:
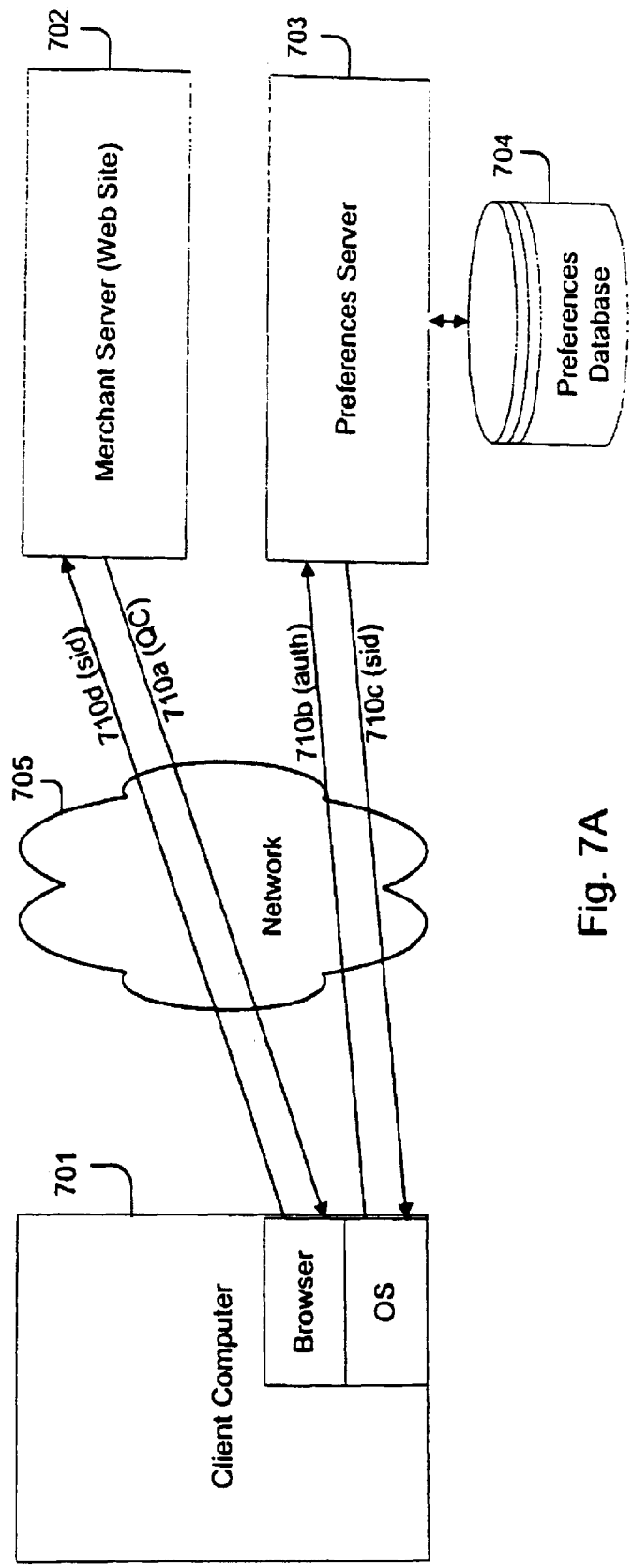

FIG. 7A shows the exchange of messages between the user, merchant, and the framework server during authentication. First, in step 710a, the merchant server 702 provides a browser at client computer 701 access to its web page. The user can view the web page and can select a set of products or services offered by the merchant, and thereafter can invoke "QuickCheckout" to proceed with an e-commerce purchase. When QuickCheckout is invoked, an authentication request is sent 710b to the preferences server 703 for authentication of the user. After the user enters an authorized username and password, a session identifier is generated 710c and returned by the preferences server 703. The user's browser 701 is directed to a web page on the merchant server 702. The session identifier is then sent 710d to the merchant, e.g., in the form of a cookie. For authentication throughout the remainder of the session, this session identifier can be sent with each subsequent communication by the merchant server 702 to the preferences server 703.

Figure 7B:
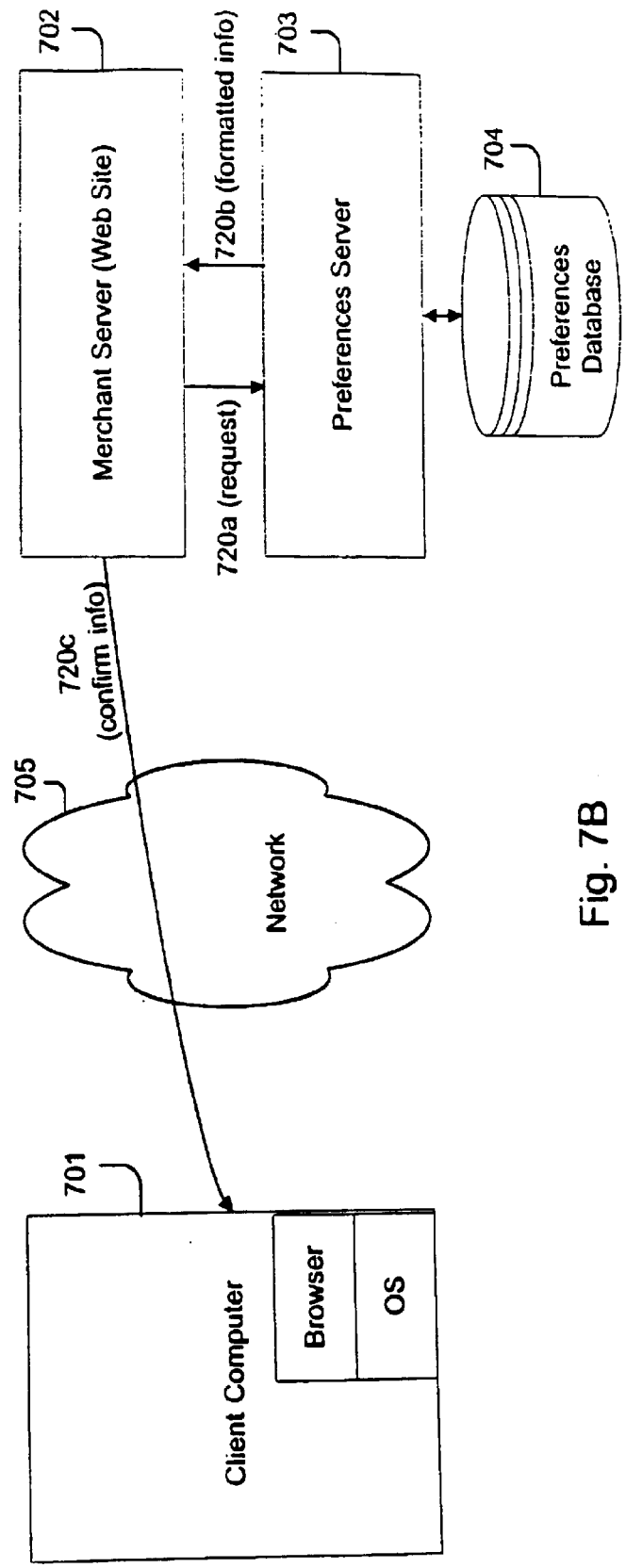

FIG. 7B shows the exchange of messages that occurs while getting purchase information to the merchant server 702. In step 720a, immediately after receiving an authentication confirmation 710d, the merchant server 702 sends the session identifier to the preferences server 703 with a request for information about the user. The merchant server 702 also sends an X.509 SSL server certificate and a set of merchant preferences in the authentication request of step 720a This certificate is used by the preferences server 703 to verify the identity of the merchant server 702 initiating the request for information. The preferences requested by the merchant server 702 of the preferences server 703 can be used to tailor later content and services provided by the merchant server 702 to the client computer 701.

In step 720b, preferences information about the user can be returned by the preferences server 703 to the merchant server 702. In step 720c, the information can be formatted into a web page requesting confirmation of the information from the user at client computer 701. At this stage, only a portion of any previously entered credit card information is returned for security purposes, the returned information providing enough information for the user to confirm and/or edit the user information at this stage.

Figure 7C:
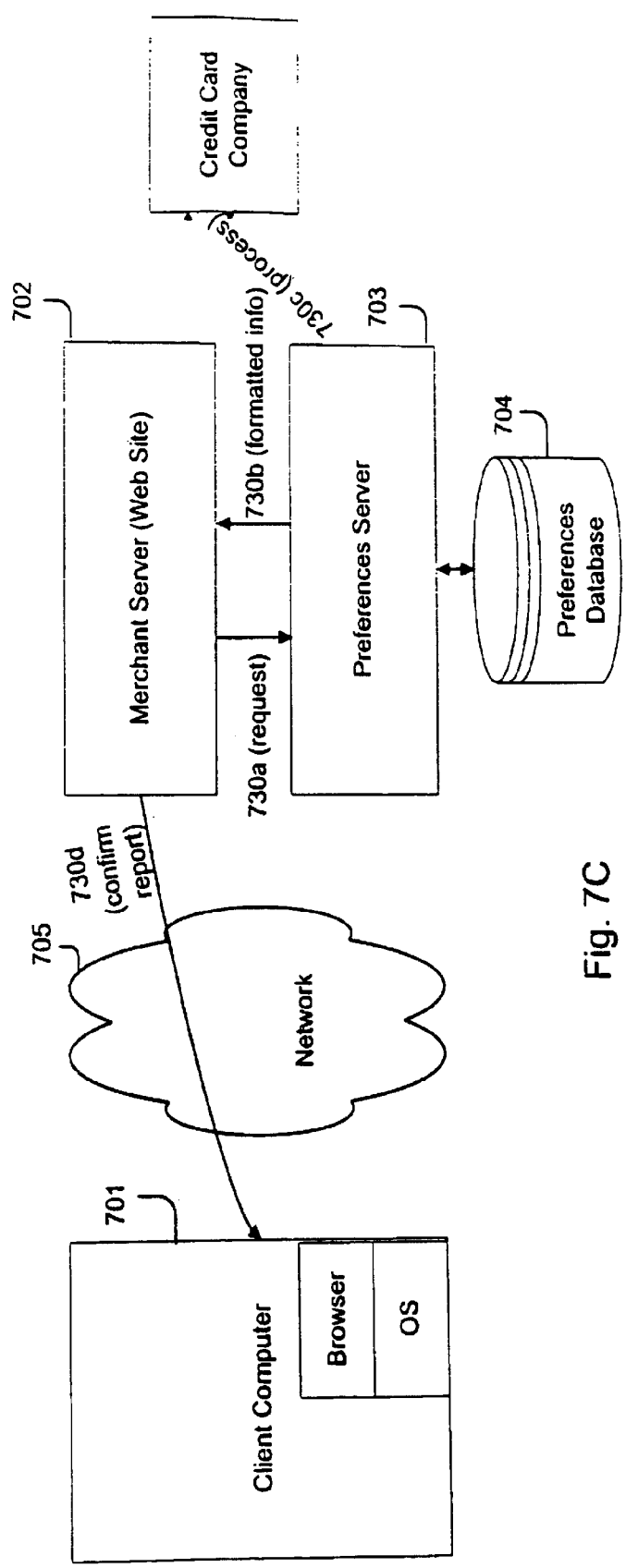

Referring to FIG. 7C, the process of obtaining payment information is described. At step 730a, once the preferences information is confirmed by the user, the merchant server 702 sends the session identifier with a request for full payment information to the preferences server 702. The user's full credit card information can then be returned to the merchant server 702 in step 730b. If the merchant server 702 does not receive the information, the merchant server 702 can check the HTTP return status code and take appropriate action. Otherwise, once payment information is received by the merchant server 702, the transaction can be processed with the credit card company in step 730c, and wait for authorization. The preferences server 703 can also process the payment information with the credit card company.

Finally, the results of this transaction are sent to preferences server 703 for customer service, record keeping, and order tracking purposes. These results can be stored in the database for use in future transactions. The merchant can check the HTTP return status code from the preferences server 703 and take appropriate action, if a failure occurs.

Figure 8:
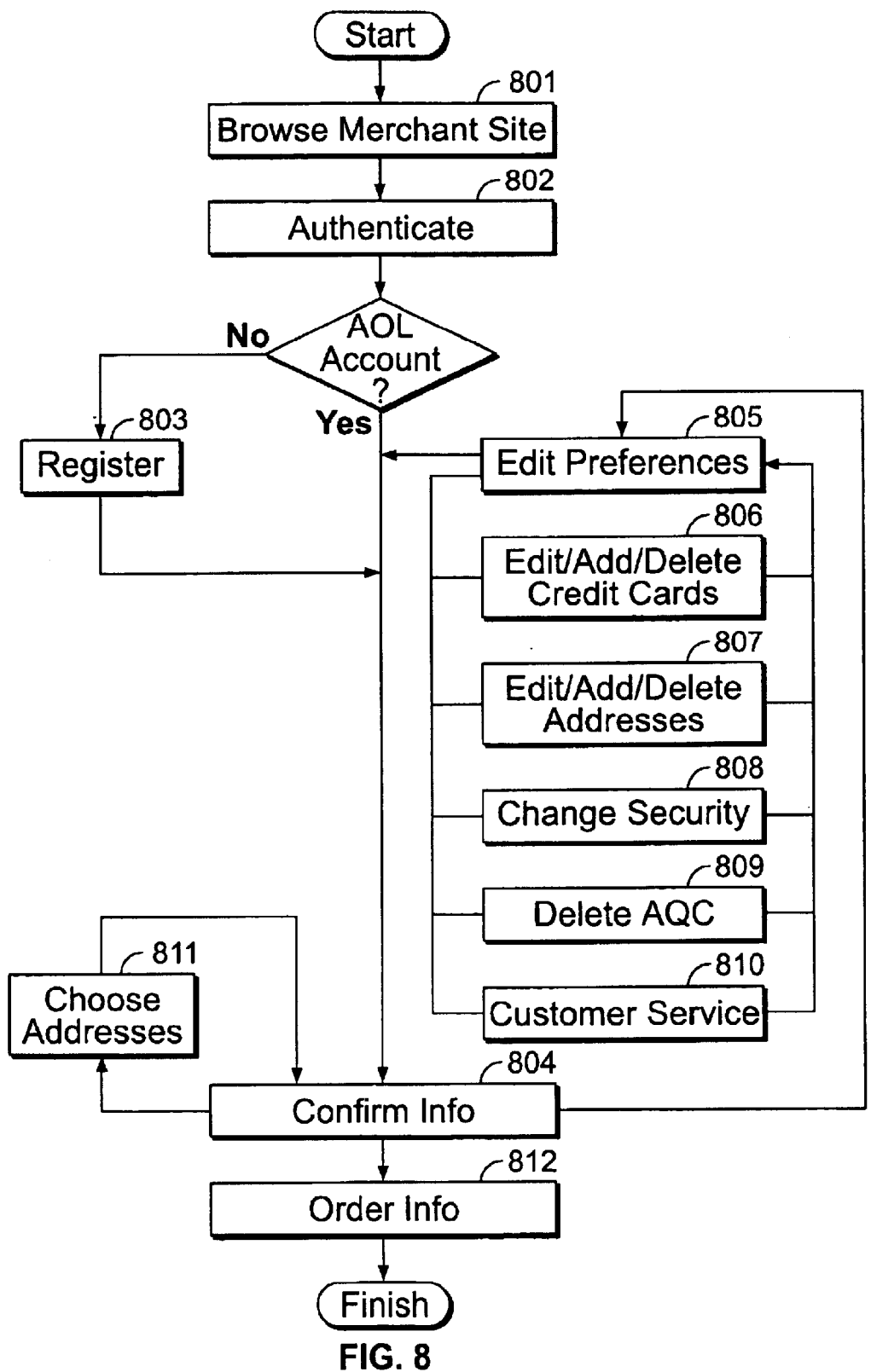
FIG. 8 is a flowchart of the typical sequence of screens displayed to users.

The flowchart of FIG. 8 shows primary paths involved in a typical transaction. The process also includes appropriate error handling and alternative entry points when necessary. An exemplary sequence of screens from the user's perspective is shown in FIGS. 9-20.

Figure 9:
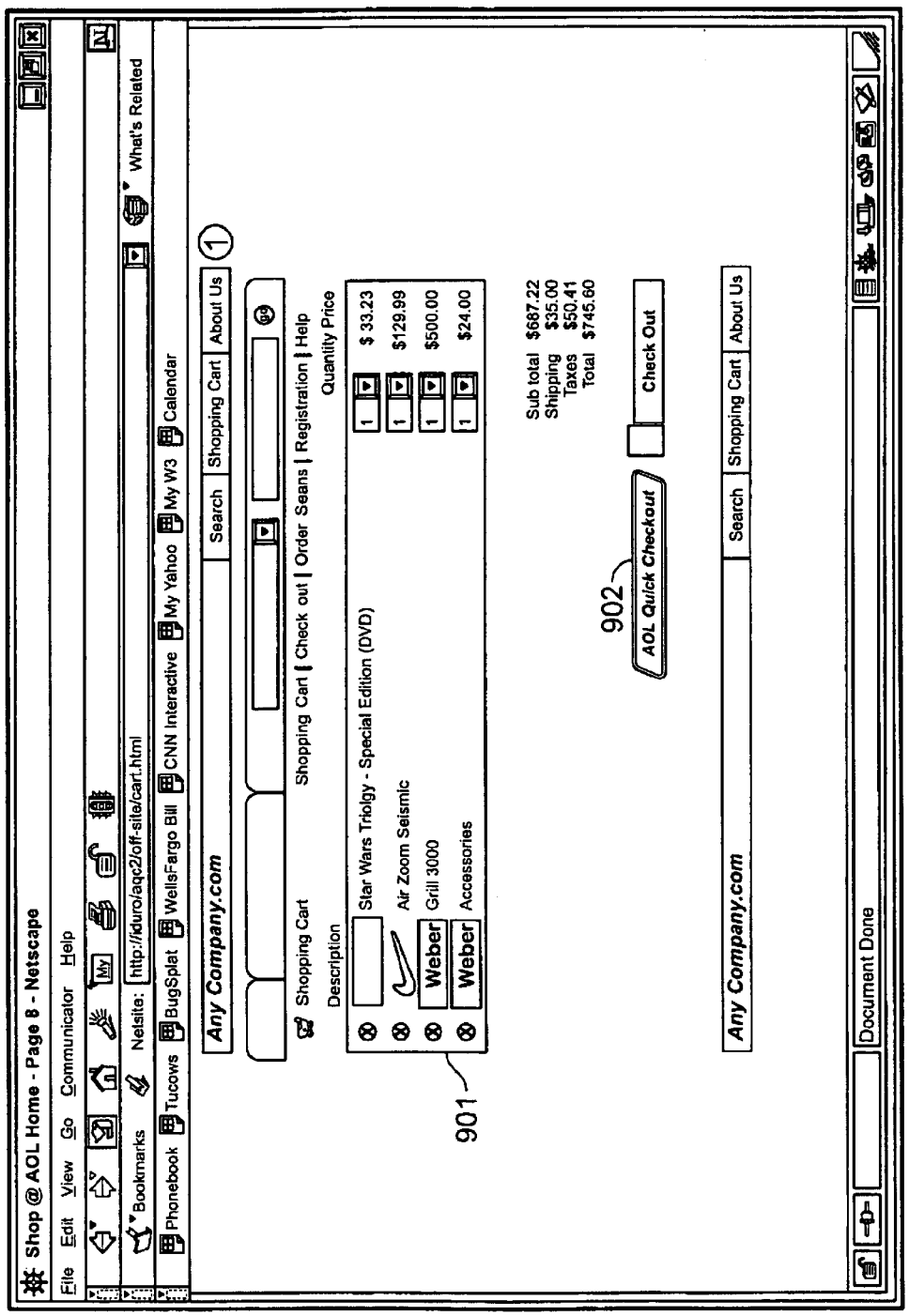
FIG. 9 is a screenshot of an exemplary merchant's product ordering page.

Referring to FIG. 8, the user can browse the merchant's site and can select some items for purchase (step 801). FIG. 9 shows such a screen with some products 901 selected for purchase. From this page, the user clicks the "AOL Quick Checkout" button 902. This button initiates the authentication request described above.

Figure 10:
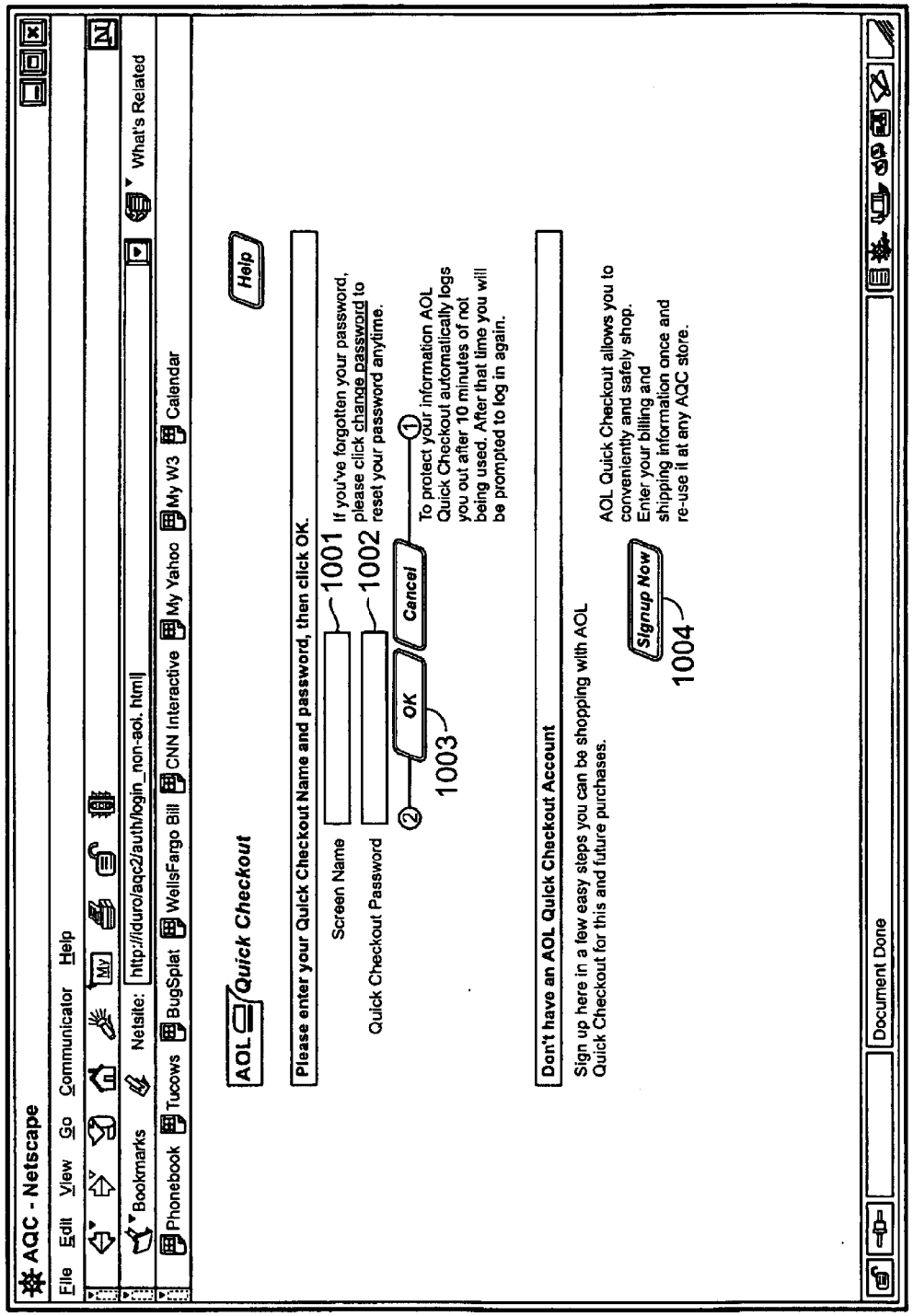
FIG. 10 is a screenshot of an exemplary framework authentication page.
Figure 11A:
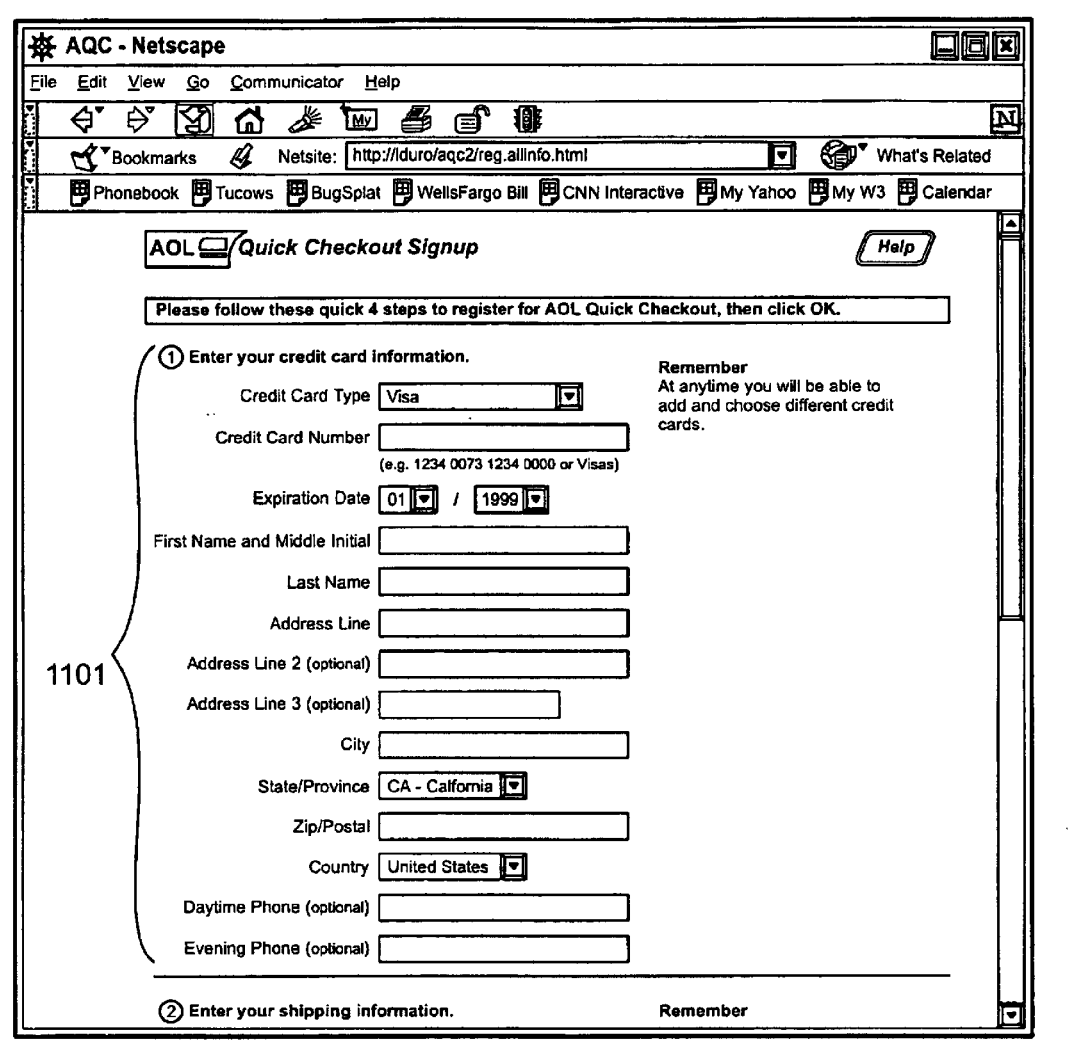
Figure 11B:
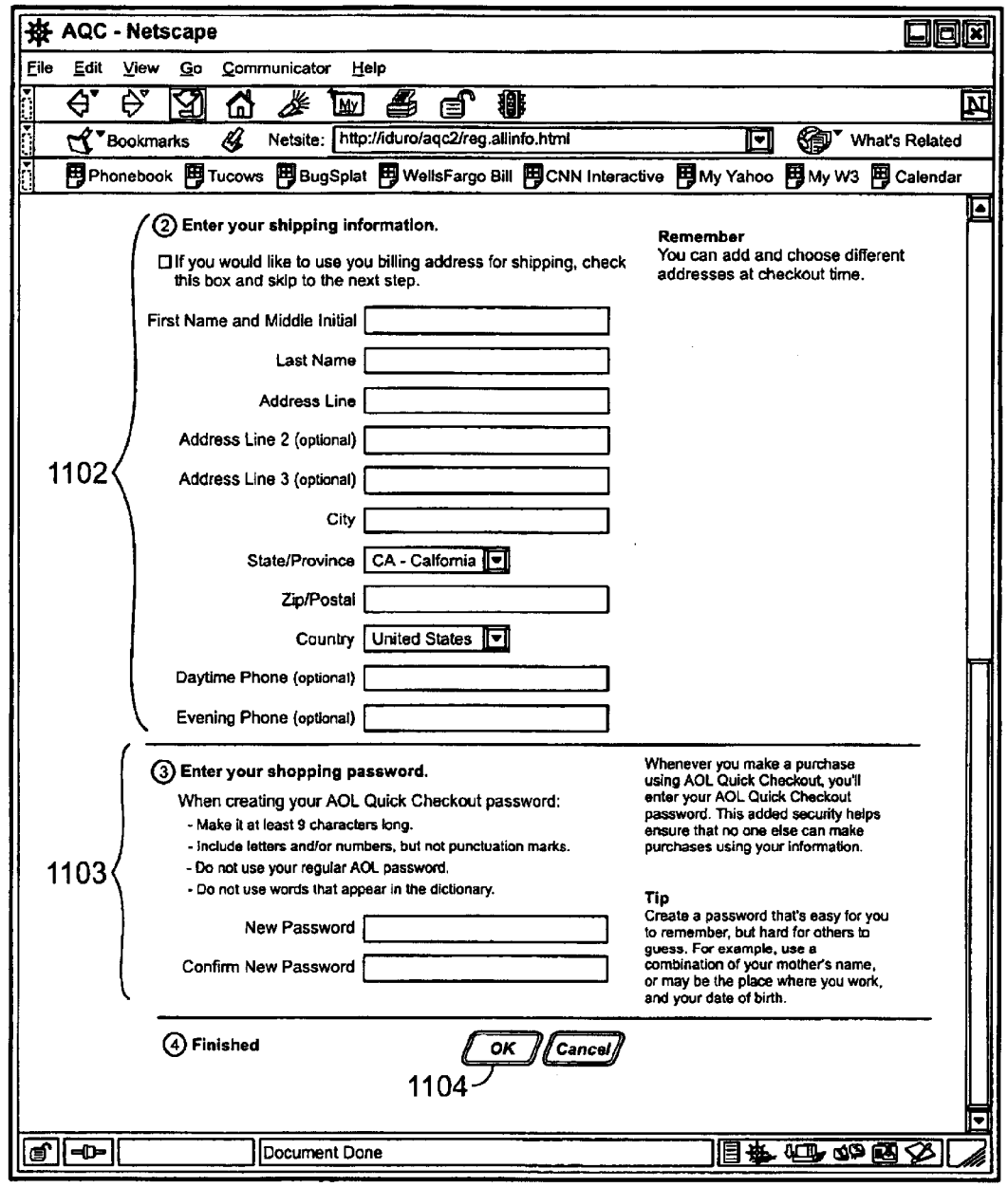
FIG. 11B is the second page of the screenshot of FIG. 12A.

Next, the user can be shown the authentication page from website, e.g., the AOL site (step 802). This page is shown in FIG. 10. If the user has an AOL account (803a), the user enters his screen name 1001 and password 1002, and then clicks on the "OK" button 1003. If the user does not have an AOL account (803a), the user can register (803) by clicking on the "Signup Now!" button 1004. An exemplary form for the registration step 803 is shown in FIGS. 11A and 11B. The form can request credit card information 1101, shipping information 1102, and account information 1103. After entering this information, the user can register by clicking the "OK" button 1104.

Figure 12:
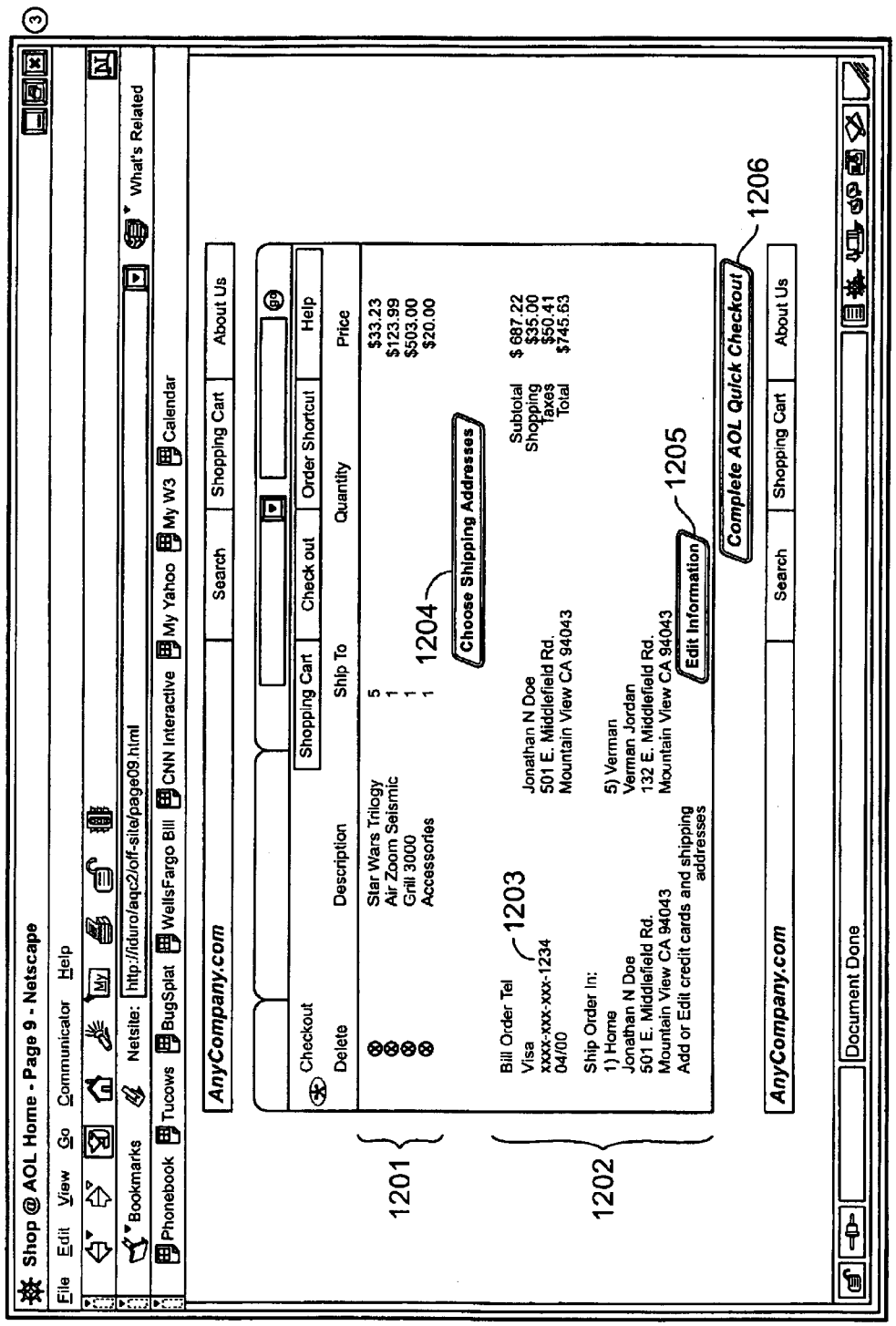
FIG. 12 is a screenshot of an exemplary merchant's order confirmation page.

Once the user has either successfully authenticated or registered, the user is shown a web page to review the order information. FIG. 12 shows how this page details the order 1201 and shows the default transaction information 1202 provided by the framework server to the merchant. Only the last four digits of any credit card number 1203 are provided at this stage. From this screen, if the shipping addresses are inaccurate (804b), the user can choose shipping addresses by clicking on the "Choose Shipping Addresses" button 1204. Also, if the preferences are inaccurate (804b), the user can choose to edit the transaction information by clicking on the "Edit Information" button 1205. When the user is satisfied with the addresses and transaction information, the user can click on the "Complete AOL Quick Checkout" button 1206 to confirm the transaction. By confirming the transaction, the user is authorizing the merchant to complete the transaction with the credit card company using the information displayed.

Figure 13:
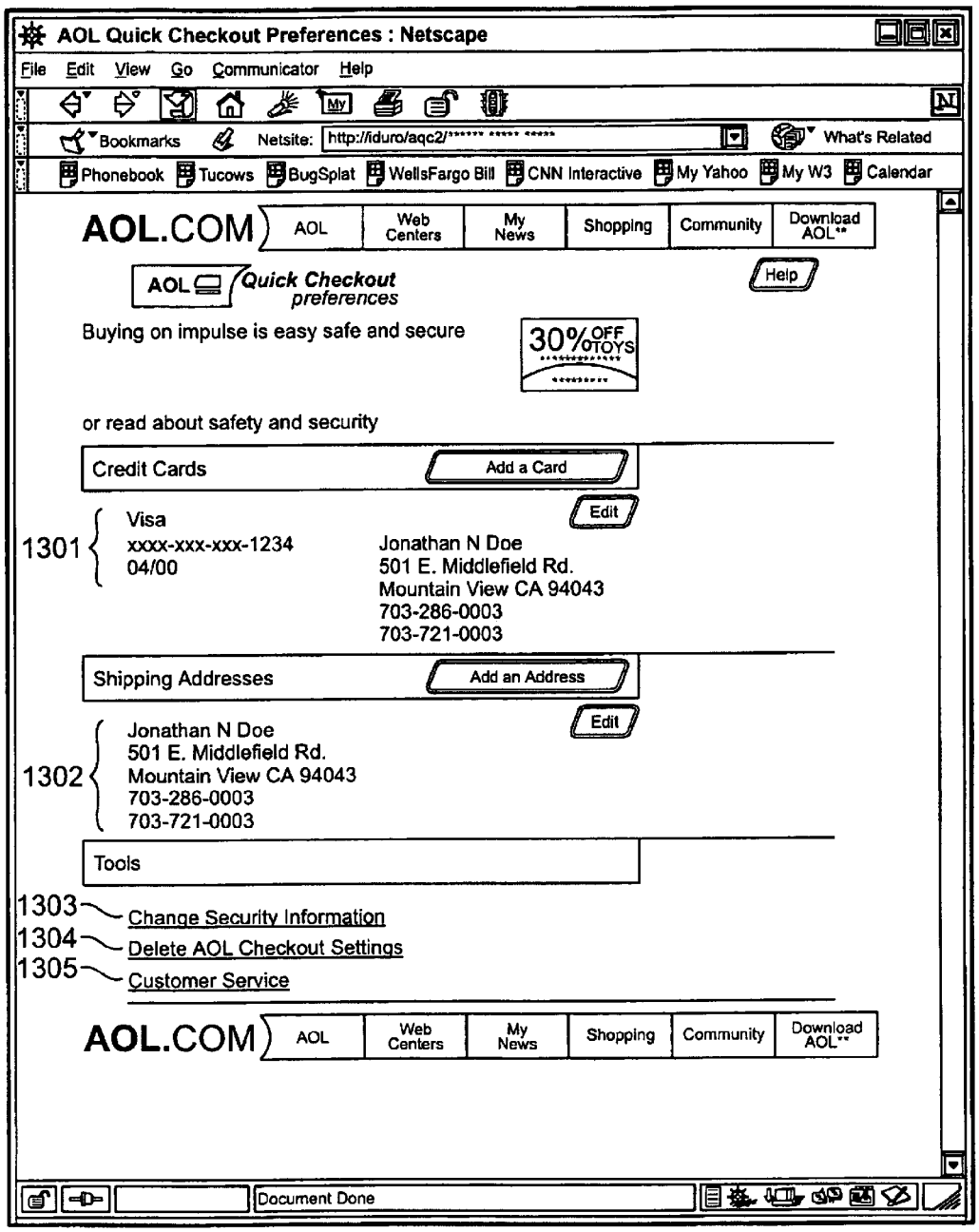
FIG. 13 is a screenshot of an exemplary framework edit preferences page.

If the user chooses to edit transaction information, the user is shown a set of edit screens (step 805). The first such screen is shown in FIG. 13 and the user can, for instance, edit credit cards 1301, edit shipping addresses 1302, change security information 1303, delete AOL Quick Checkout settings 1304, and request customer service 1305. Once the user makes a selection, the appropriate screen is displayed.

Figure 14:
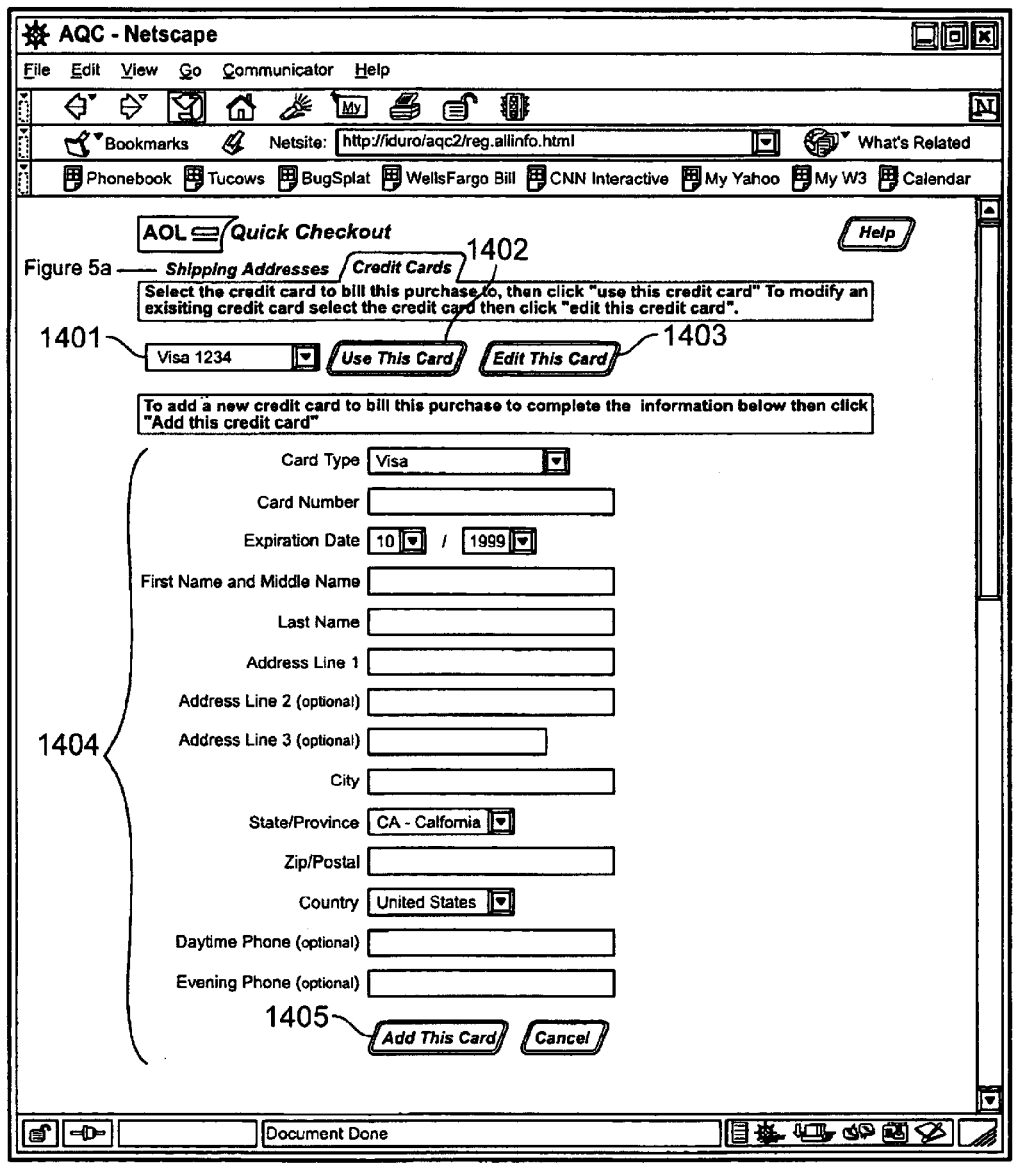
FIG. 14 is a screenshot of an exemplary framework edit credit cards page.

If the user chooses to edit credit cards, a screen, as shown in FIG. 14 (step 806), is displayed to allow the user to select a credit card for use in the current transaction by selecting a currently defined credit card 1401 and clicking the "Use This Card" button 1402. The user also can edit a credit card's information by clicking the "Edit This Card" button 1403. To edit a card or add information about a new credit card, the user can complete the fields in the lower portion of the screen 1404. When the user is finished editing, the user can click the "Add This Card" button 1405 to add the information to his profile.

Figure 15:
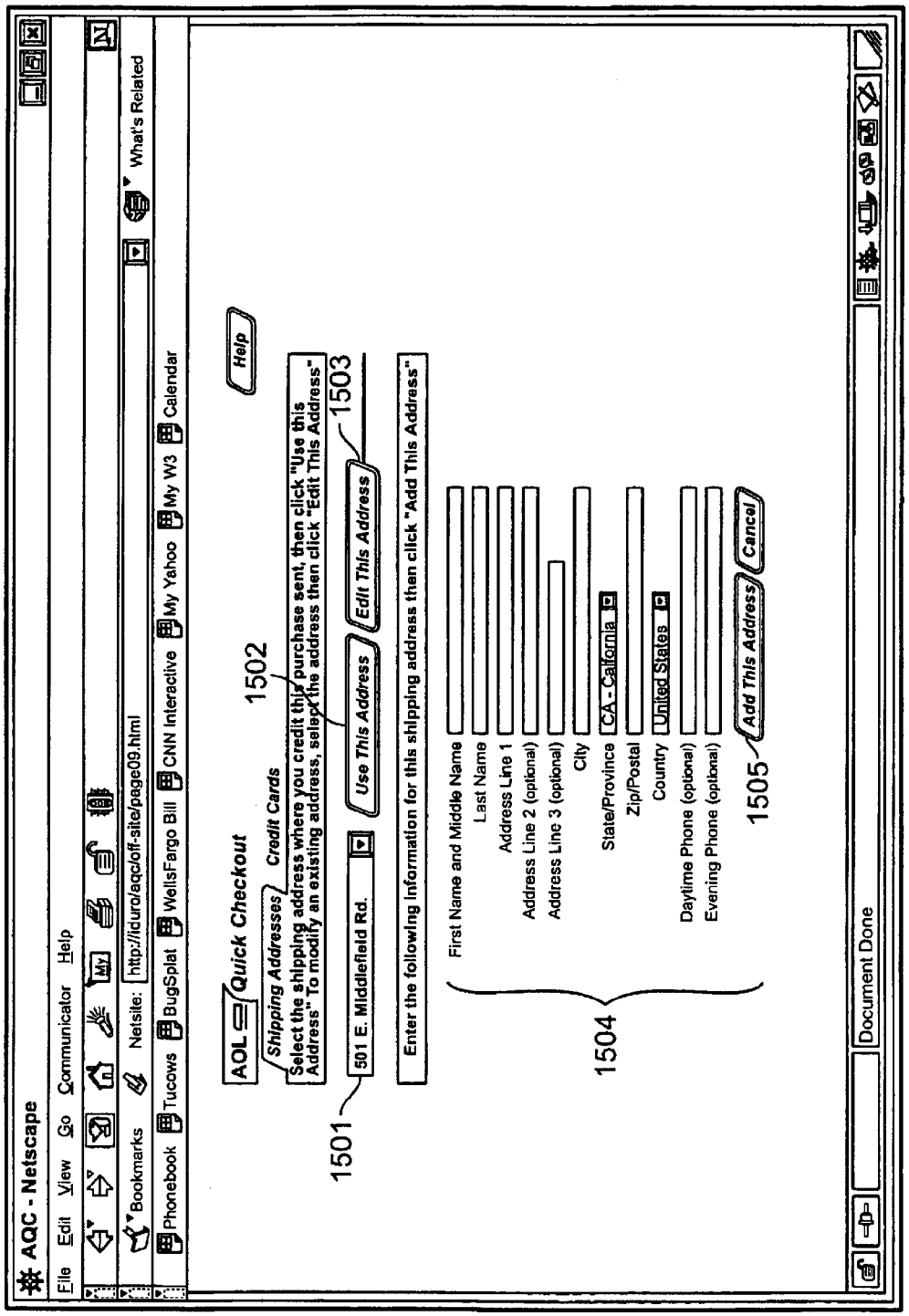
FIG. 15 is a screenshot of an exemplary framework edit addresses page.
Figure 16:
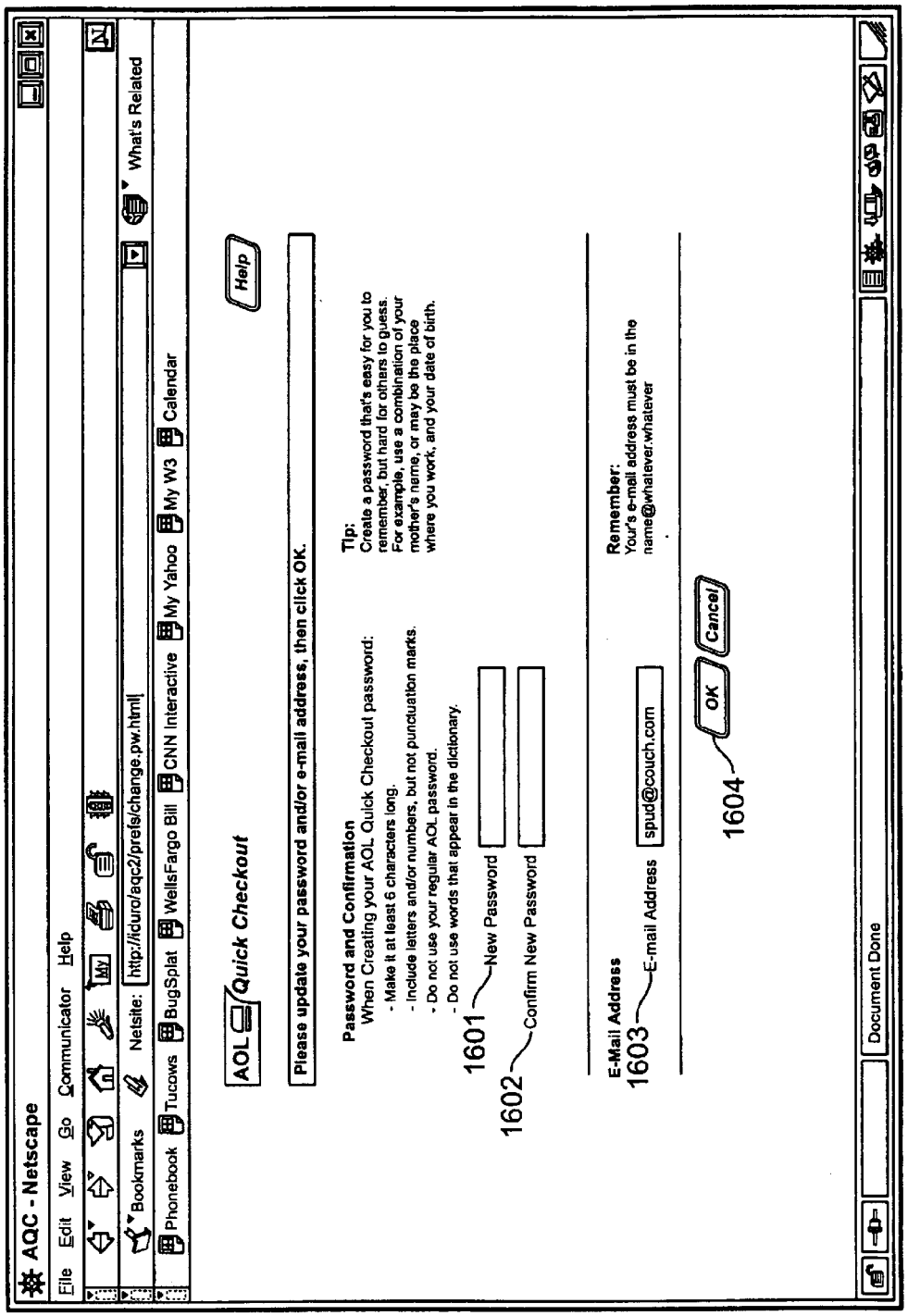
FIG. 16 is a screenshot of an exemplary framework change security page.

If the user chooses to edit addresses, the process is similar to that for editing credit cards, as shown in FIG. 15 (step 807). This screen allows a user to select a shipping address for use in the current transaction by selecting one of the currently defined shipping addresses 1501 and clicking the "Use This Address" button 1502. The users can also edit an address by clicking the "Edit This Address" button 1503. To edit an address or add a new address, the user can complete the fields in the lower portion of the screen 1504. When the user is done editing, the user can click the "Add This Address" button 1505 to add the information to his profile. If the user chooses to change security information, the screen, as shown in FIG. 16 is displayed (step 808) to allow a user to enter 1601 and confirm 1602 a new password by typing the new password into a form. The user can also change the email address 1603 associated with his profile. When the user is done editing, the user can click the "OK" button to confirm the changes and continue.

Figure 17:
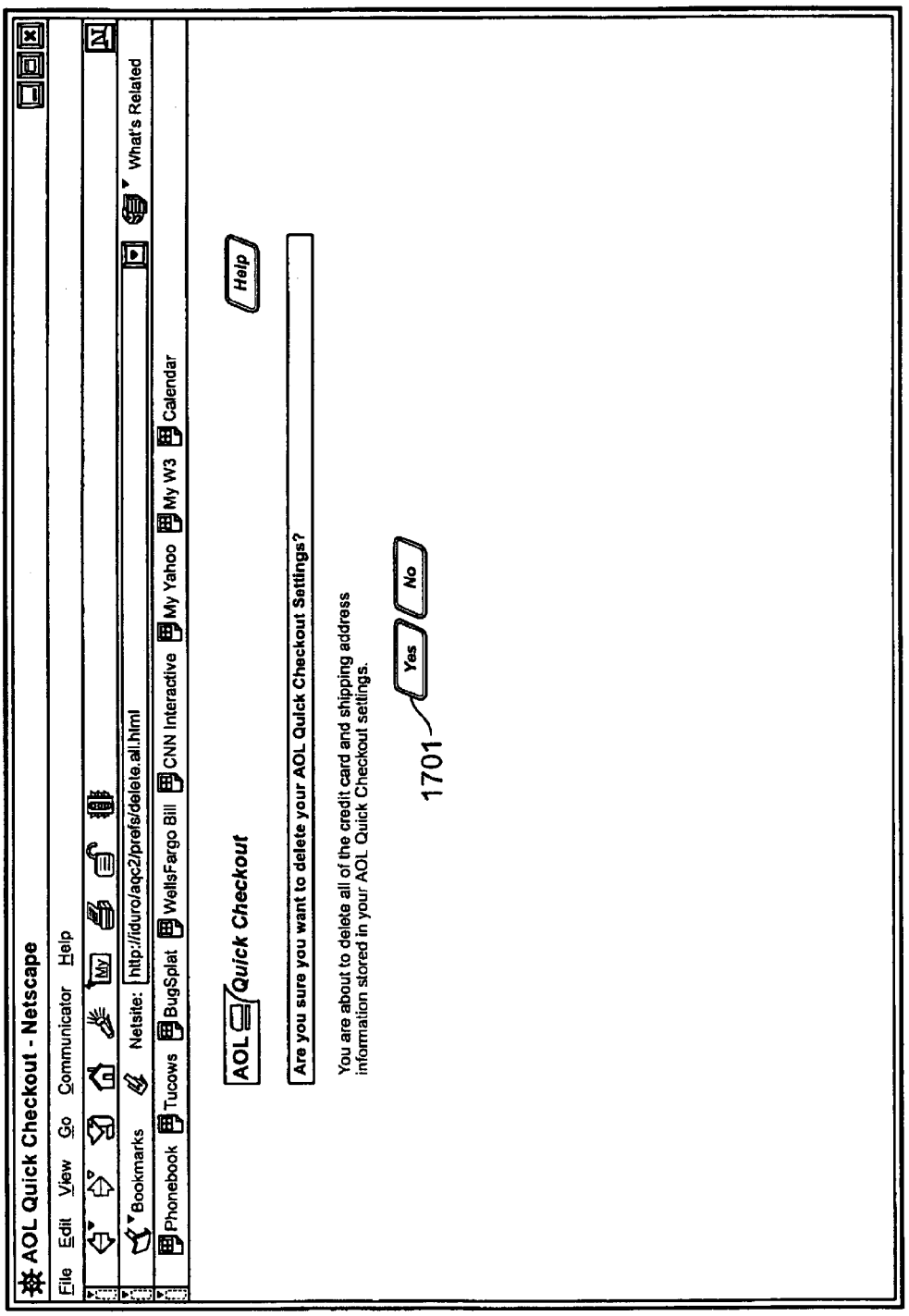
FIG. 17 is a screenshot of an exemplary framework delete preferences page.

If the user chooses to delete AOL Quick Checkout settings, the screen shown in FIG. 17 is displayed (step 809), to ask a user to confirm that the user wants to delete all of credit card and shipping address information stored in the profile. The user can confirm by clicking on the "Yes" button 1701.

Figure 18:
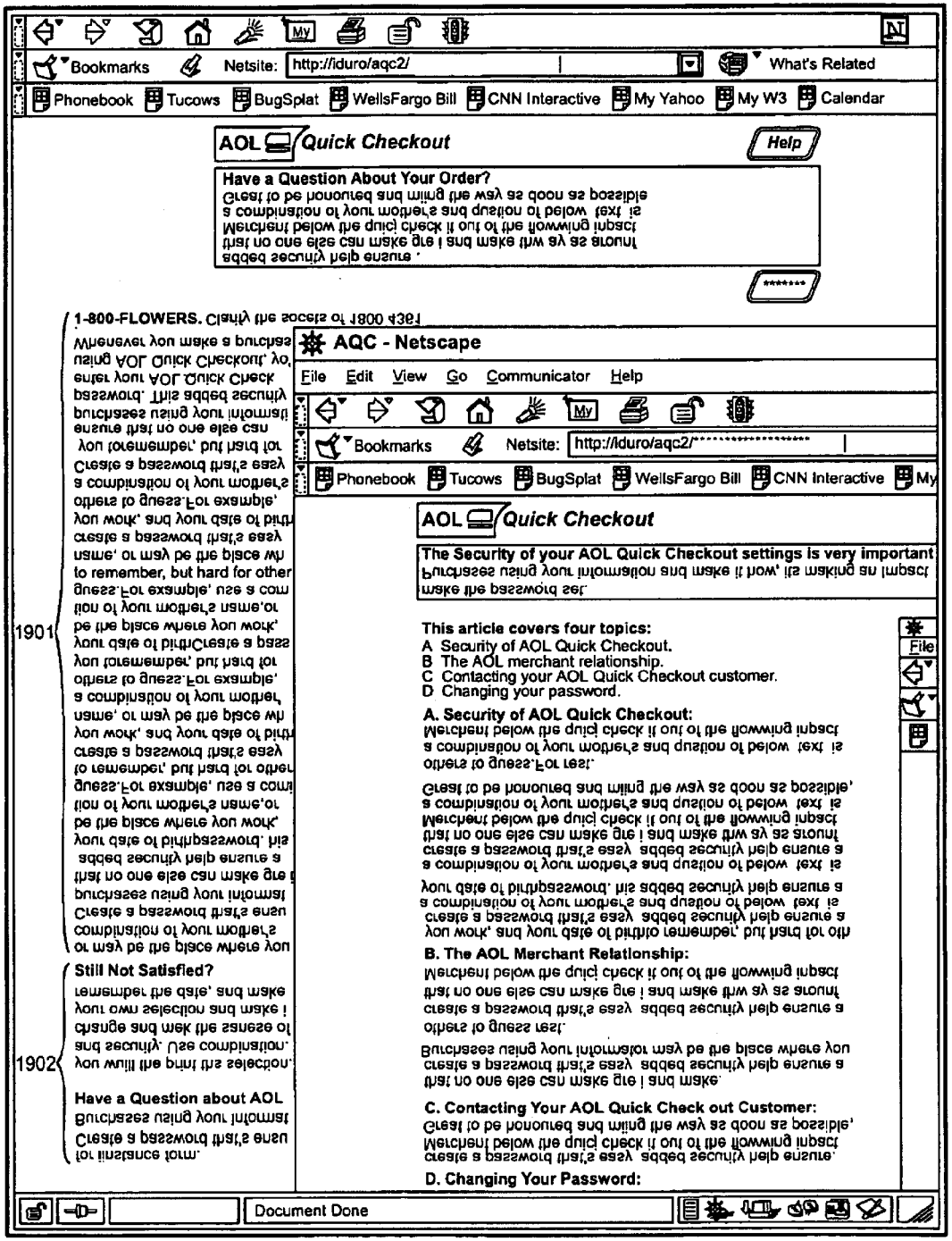
FIG. 18 is a screenshot of an exemplary framework customer service page.

If the user requests customer service, the screen shown in FIG. 18 is displayed (step 810) with customer service information 1801 for the companies associated with the AOL Quick Checkout service and additional information about the AOL Quick Checkout service 1802.

Figure 19:
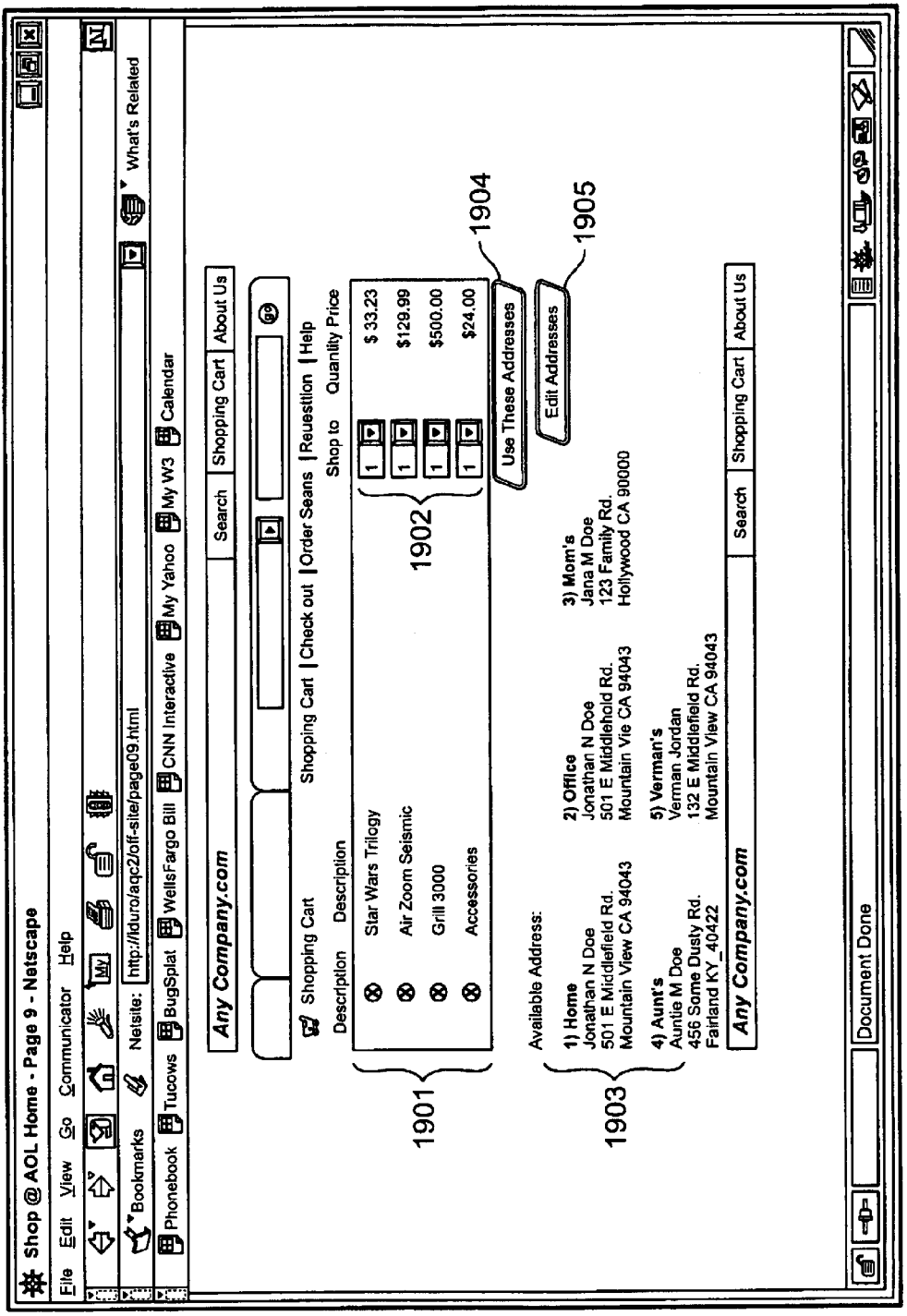
FIG. 19 is a screenshot of an exemplary merchant's choose addresses page.

If the user in step 804 of FIG. 8 decides to choose addresses instead of editing preferences, the screen shown in FIG. 19 displayed to show the products 1901 selected by the user for purchase (step 811). The user can assign one of the addresses 1903 to each product by selecting the appropriate number in the pulldown menu 1902. Once the user has finished selecting addresses, the user can finalize his choices by clicking on the "Use These Addresses" button 1904. In addition, the user can edit addresses, as discussed above in step 807 of FIG. 8, by clicking the "Edit Addresses" button 1905.

Figure 20:
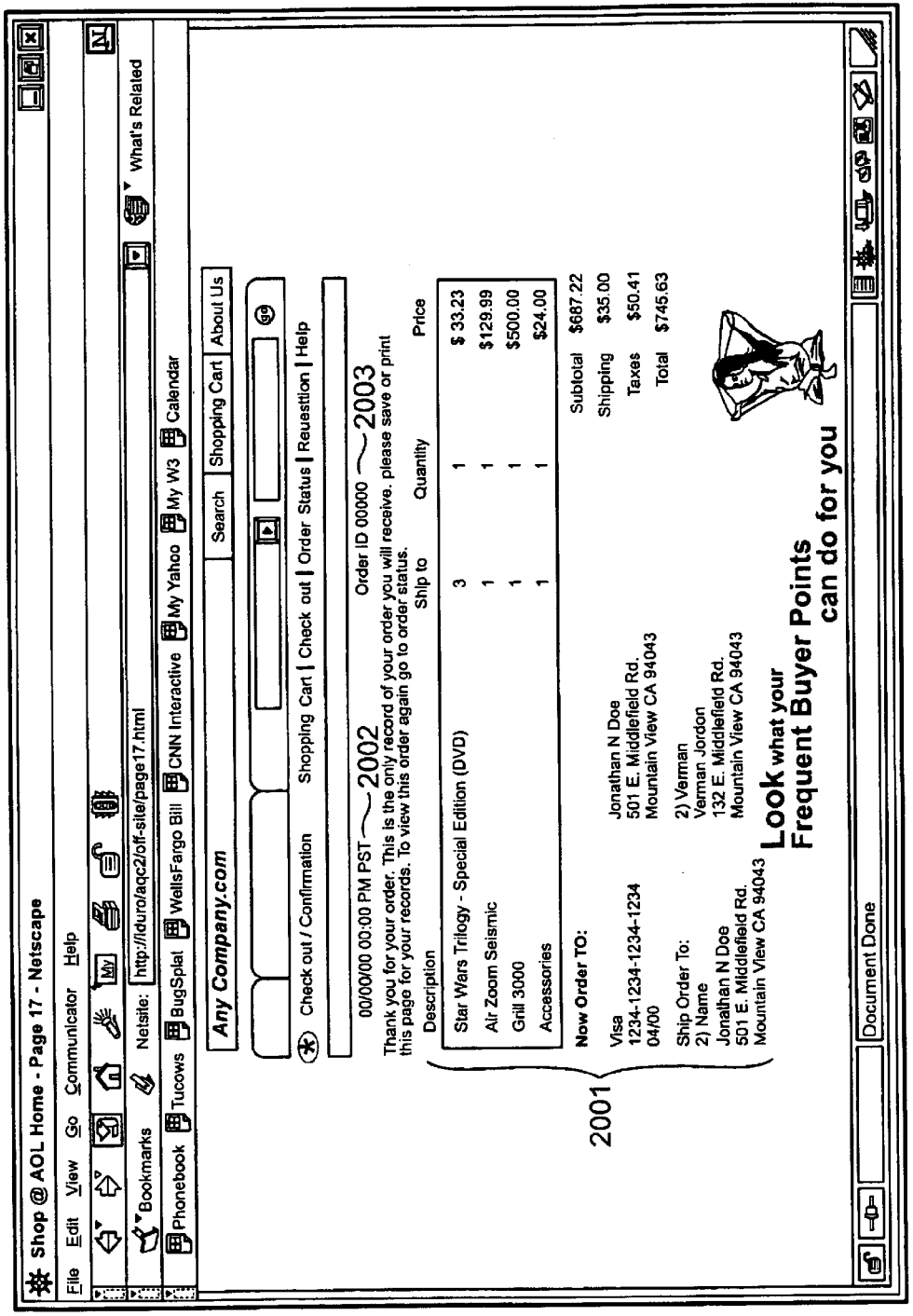
FIG. 20 is a screenshot of an exemplary merchant's order information page.

If the user in step 804 of FIG. 8 is satisfied with the transaction selections, and has clicked the button 1206 to complete the transaction, a final page verifying that the transaction has been completed is displayed (step 812). This screen, as shown in FIG. 20, displays the transaction information 2001 that was used by the merchant to complete the credit card purchase. The display can include a confirmation string 2002 or order identification string 2003 for record keeping purposes.

In some implementations, a proxy server is used with the host-to-host architecture. The proxy an act as an intermediary for traffic between host service computers and the Internet. The proxy can perform load balancing by switching connections to the least utilized hardware for performance. The proxy also contains a list of hosts that can be redirected to internal AOL sites. The internal sites provide AOL users with a more consistent look and feel. The internal sites can also be more tightly integrated with the AOL system because they are under AOL control.

In another implementation, as a user selects items to purchase from a particular merchant, the merchant collects and stores information about the purchase order, designated with an order identifier that is used to unify the order information. The order information typically is presented to the consumer (user) in a shopping cart upon request or at checkout. Using this order information, the consumer can confirm the contents of the shopping cart by invocation of QC or otherwise, as the order identifier can tie a subsequent QC information to the order information stored by the merchant.

Then, when the consumer launches QC, for example, by clicking on an icon at the merchant website, the merchant authenticates the consumer as a QC user. To do so, the merchant directs users to the AQC aolqc_auth url for authentication. If the GET to this url returns successfully, the user can be "logged in" as an AQC member. For example, the GET returns with a session identifier (aolqc_session_id) which serves as a key to the consumer account. Thereafter, the session id is passed with each backend call made by the merchant e.g., to retrieve billing information for the customer or to enable editing by the customer. Once the consumer is authenticated once by a merchant, the consumer will not be redirected back to the authentication page until the consumer has logged off of the AOL service.

If authenticated, payment and shipping information is collected from QC. Preferably, the merchant makes a host-to-host call to fetch a "pretty print" user-displayable version of the user's default billing and shipping information from the QC, which does not include all of the information. The merchant then automatically produces a form that includes an order id, which is posted to https://payment.aol.com/placeorder. For instance, a standard form can include the parameters listed in Appendix A (see parameters spanning pp 5–6 of AOL QC Merchant Connectivity Specification filed with provisional application No. 60/160,874 filed Oct. 22, 1999, which is incorporated by reference in its entirety). Using the order_allow_multi_shipto field of the placeholder form, a merchant can enable designation of different shipping destinations for different aspects of the order, e.g., per unit or per item. Similarly, other fields can be duplicated to provide flexibility, as needed.

In response to the placeorder form, available QC information can be returned from the wallet and posted at the merchant. Default QC information can be automatically selected to eliminate the need for additional user interaction, unless editing is necessary. Alternatively, the consumer can select among available QC information, e.g., credit card, shipping address information. In either case, a subset of the sensitive QC information from the wallet can be provided to the merchant in response to the placeorder request. This subset can include enough for the consumer to confirm/select, but intentionally omits some information to avoid possible security problems, such as trojan horses. The selected subset of QC information can be posted by the QC host to the merchant site at the https://payment.aol.com/order target_url page for future use in creating a confirmation page combining order and QC information. Fields from an exemplary form are listed on pgs. 6–7 of AOL QC Merchant Connectivity Specification, which was filed with provisional application No. 60/160,874 filed Oct. 22, 1999, which is incorporated by reference in its entirety). If the merchant can allow multiple shipping destinations for aspects of a single order, and the consumer can designate multiple destinations in the information provided by the merchant to the host, multiple posts can be made by the host to the https://payment.aol.com/order_target_url page. Each post can have the same order id, number but different information where appropriate to accomplish the consumer order.

After the consumer is redirected to the merchant site, the merchant can provide an order confirmation page displaying the order and payment data. Specifically, the merchant can generate a form that displays the selected QC info and that queries the consumer to confirm the purchase. The confirmation page posts to a designated location known to wallet host, e.g., https://payment.aol.com/confirmorder. Fields from an exemplary form are listed in Appendix C (see list of parameters listed on p8 of AOL QC Merchant Connectivity Specification). If the merchant allows multiple shipping destinations for aspects of a single order, the consumer can designate multiple destinations in the information provided by the merchant to the host, and multiple posts can be made by the host to the https://payment.aol.com/order_target_url page with the same order id number. The merchant can generate a confirmation page for each part of the order. Generally, information is filtered before being returned to the merchant for confirmation (to prevent the merchant from obtaining enough financial information to complete the transaction until after the complete transaction is confirmed by consumer). The merchant can then display a screen requesting confirmation of the transaction with limited information being shown about the credit card.

After the order has been confirmed, three processes are performed:

1. the customer is redirected to the http://payment.aol.com/order_return_url page, which displays a message from the merchant thanking the customer for their order, 2. the merchant receives complete credit card information from the host along with other order information that is posted to a target url specified in the order_target_url_field of the initial post generated by the merchant. This information is used by the merchant to deliver the ordered goods. An exemplary format for the order information is shown by appendix D (see pp 8–10 of AOL QC Merchant Connectivity Specification), and 3. the merchant pushes order data to a URL accessible to the wallet host for customer service, record keeping and order tracking purposes.

Using this system and the ability to store and share personal information, enhanced functionality such as parental controls, AOL rewards, gift reminders, purchase history, and keyword billing can be provided.

Furthermore, integration with a service provider enabling several screen-names for a single account can allow the user to designate separate wallets/passports for different members on an account, each drawing on some common and some independent information. For instance, several family members having different screen-names can each maintain independent wallets with separate e-commerce information, while being provided access to a shared wallet having shared e-commerce information. In this manner, selected credit cards or e-commerce information can be made accessible to some or all screen-names without sharing all credit cards or other e-commerce information. Furthermore, when combined with the passport functionality, this model can allow information to be maintained and communicated for each independent screen-name.

The techniques, methods, and systems described here can find applicability in any computing or processing environment in which electronic content can be viewed, accessed, or otherwise manipulated. For instance, the concept of sharing e-commerce transaction information between hosts in a networked computing environment can be applied whenever those preferences are useful to a third party, such as an e-commerce merchant. One such environment can involve a computer system, e.g., a Microsoft Windows-based PC or Apple Macintosh, connected to the Internet.

Various implementations of the systems and techniques described here can be realized in digital electronic circuitry, or in computer hardware, firmware, software, or in combinations thereof. A system or other apparatus that uses one or more of the techniques and methods described here can be implemented as a computer-readable storage medium, configured with a computer program, where the storage medium so configured causes a computer system to operate on input and/or generate output in a specific and predefined manner. Such a computer system can include one or more programmable processors that receive data and instructions from, and transmit data and instructions to, a data storage system, and suitable input and output devices.

Each computer program can be implemented in a high-level procedural or object-oriented programming language, or in assembly or machine language if desired; and in any case, the language can be a compiled or interpreted language. Suitable processors include, by way of example, both general and special purpose microprocessors.

Generally, a processor can receive instructions and data from a read-only memory and/or a random access memory. Storage devices suitable for tangibly embodying computer instructions and data can include forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing can be supplemented by, or implemented in, specially designed ASICs (application specific integrated circuits).

A number of implementations have been described. Nevertheless, it will be understood that various modifications can be made without departing from the spirit and scope of the invention. For example, advantageous results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A computer-implemented method for sharing a user's personal information with a merchant server so as to facilitate an e-commerce transaction in a networked computing environment, the method comprising:

collecting personal information from a user of a computer network;

storing the user's personal information in a server;

associating, at the server, a session identifier with the user's personal information;

receiving, at the server, a request from a merchant server for at least a portion of the user's personal information, wherein the request includes a session identifier;

determining, at the server, that the received session identifier corresponds to the session identifier associated with the user's personal information; and sending, from the server, at least a portion of the user's personal information to the merchant server when the received session identifier corresponds to the session identifier associated with the personal information.

2. The method of claim 1 wherein associating, at the server, a session identifier with the user's personal information comprises:

receiving, at the server, information that authenticates the user;

generating, at the server, the session identifier in response to the server receiving the information that authenticates the user; and associating, at the server, the generated session identifier with the user's personal information.

3. The method of claim 2 wherein the information that authenticates the user comprises a username and password such that receiving, at the server, information that authenticates the user comprises receiving, at the server, a username and password.

4. The method of claim 2 further comprising sending, from the server, the generated session identifier to a client computer being used by the user.

5. The method of claim 1 wherein the personal information comprises credit card information such that storing the user's personal information in a server comprises storing credit card information.

6. The method of claim 5 wherein sending, from the server, at least a portion of the user's personal information to the merchant server comprises sending partial credit card information to the merchant server such that the merchant server can solicit confirmation from the user that a credit card account associated with the credit card information should be used to perform the e-commerce transaction.

7. The method of claim 5 wherein sending, from the server, at least a portion of the user's personal information to the merchant server comprises sending full credit card information to the merchant server such that the merchant server can perform the e-commerce transaction using the credit card information.

8. The method of claim 1 further comprising:

receiving, at the server, a digital certificate from the merchant server; and verifying the identity of the merchant server using the digital certificate.

9. The method of claim 1 wherein the user's personal information includes one or more of the user's name, address, credit card information, telephone number, facsimile number, e-mail address, employer name, employer address, work telephone number, buying history, travel preferences, food preferences, medical information, and personal interests.

10. A device for sharing a user's personal information with a merchant server so as to facilitate an e-commerce transaction in a networked computing environment, the device comprising:

means for collecting personal information from a user of a computer network;

means for storing the user's personal information in a server;

means for associating, at the server, a session identifier with the user's personal information;

means for receiving, at the server, a request from a merchant server for at least a portion of the user's personal information, wherein the request includes a session identifier;

means for determining, at the server, that the received session identifier corresponds to the session identifier associated with the user's personal information; and means for sending, from the server, at least a portion of the user's personal information to the merchant server when the received session identifier corresponds to the session identifier associated with the personal information.

11. The device of claim 10 wherein the means for associating, at the server, a session identifier with the user's personal information comprises:

means for receiving, at the server, information that authenticates the user;

means for generating, at the server, the session identifier in response to the server receiving the information that authenticates the user; and means for associating, at the server, the generated session identifier with the user's personal information.

12. The device of claim 10 wherein the information that authenticates the user comprises a username and password such that the means for receiving, at the server, information that authenticates the user comprises means for receiving, at the server, a username and password.

13. The device of claim 10 further comprising means for sending, from the server, the generated session identifier to a client computer being used by the user.

14. The device of claim 9 wherein the personal information comprises credit card information such that the means for storing the user's personal information in a server comprises means for storing credit card information.

15. The device of claim 14 wherein the means for sending, from the server, at least a portion of the user's personal information to the merchant server comprises means for sending partial credit card information to the merchant server such that the merchant server can solicit confirmation from the user that a credit card account associated with the credit card information should be used to perform the e-commerce transaction.

16. The device of claim 14 wherein the means for sending, from the server, at least a portion of the user's personal information to the merchant server comprises means for sending full credit card information to the merchant server such that the merchant server can perform the e-commerce transaction using the credit card information.

17. The device of claim 9 further comprising:

means for receiving, at the server, a digital certificate from the merchant server; and means for verifying the identity of the merchant server using the digital certificate.

18. The device of claim 10 wherein the user's personal information includes one or more of the user's name, address, credit card information, telephone number, facsimile number, e-mail address, employer name, employer address, work telephone number, buying history, travel preferences, food preferences, medical information, and personal interests.

* * * * *